US 6,678,827 B1

(12) United States Patent
Rothermel et al.

(10) Patent No.: US 6,678,827 B1
(45) Date of Patent: Jan. 13, 2004

(54) MANAGING MULTIPLE NETWORK SECURITY DEVICES FROM A MANAGER DEVICE

(75) Inventors: Peter M. Rothermel, Redmond, WA (US); David Wayne Bonn, Everett, WA (US); Nick T. Marvais, Shoreline, WA (US)

(73) Assignee: WatchGuard Technologies, Inc., Seattle, WA (US)

( * ) Notice: Subject to any disclaimer, the term of this patent is extended or adjusted under 35 U.S.C. 154(b) by 0 days.

(21) Appl. No.: 09/307,332

(22) Filed: May 6, 1999

(51) Int. Cl.[7] .................... G06F 15/173; G06F 11/30
(52) U.S. Cl. ................. 713/201; 713/200; 713/201; 709/229; 709/223
(58) Field of Search ..................... 713/201, 200, 713/202, 164, 156, 155, 154, 158, 166, 172; 709/229, 223, 203, 225

(56) References Cited

U.S. PATENT DOCUMENTS

| | | | |
|---|---|---|---|
| 5,577,209 A | | 11/1996 | Boyle et al. |
| 5,940,591 A | * | 8/1999 | Boyle et al. ................. 713/201 |
| 5,968,176 A | * | 10/1999 | Nessett et al. ............... 713/201 |
| 6,052,728 A | | 4/2000 | Fujiyama et al. |
| 6,353,886 B1 | * | 3/2002 | Howard et al. ............. 713/156 |
| 6,502,140 B1 | * | 12/2002 | Boivie ........................ 709/238 |

FOREIGN PATENT DOCUMENTS

WO    WO98/54644    12/1998

OTHER PUBLICATIONS

Check Point Software Technologies, Ltd., "Check Point Firewall–1 Version 4.0 Establishes New Benchmark for Easy Deployment of Virtual Private Networks," May 4, 1998, 4 pages [http://www.checkpoint.com/press/1998/version0504.html] [accessed May 16, 2002].

WatchGuard Technologies, Inc., "WatchGuard Announces the Firebox II® for Managed Security Services," May 4, 1998, 4 pages [http://www.watchguard.com/press/releases/wg27.asp] [accessed May 16, 2002].

Check Point Software Technologies, Ltd., "Check Point Software Enables Firewall–1 and VPN–1 for Novell's NDS," Mar. 22, 1999, 2 pages [http://www.checkpoint.com/press/1999/novell032299.html] [accessed May 16, 2002].

Sun Microsystems, Inc., "Solstice™ Site Manager™ and Solstice™ Domain Manager™ 2.3 Technical White Paper," Palo Alto, California, 10/97, 16 pages.

Cheswick, William R. et al., "Firewalls and Internet Security Repelling the Wily Hacker," AT&T Bell Laboratories, Inc., Addison–Wesley, Boston, 1994.

\* cited by examiner

*Primary Examiner*—Ly V. Hua
(74) *Attorney, Agent, or Firm*—Perkins Coie LLP

(57) ABSTRACT

The present invention is directed to a facility for using a security policy manager device to remotely manage multiple network security devices (NSDs). The manager device can also use one or more intermediate supervisor devices to assist in the management. Security for the communication of information between various devices can be provided in a variety of ways. The system allows the manager device to create a consistent security policy for the multiple NSDs by distributing a copy of a security policy template to each of the NSDs and by then configuring each copy of the template with NSD-specific information. For example, the manager device can distribute the template to multiple NSDs by sending a single copy of the template to a supervisor device associated with the NSDs and by then having the supervisor device update each of the NSDs with a copy of the template. Other information useful for implementing security policies can also be distributed to the NSDs in a similar manner. The system also allows a manager device to retrieve, analyze and display all of the network security information gathered by the various NSDs while implementing security policies. Each NSD can forward its network security information to a supervisor device currently associated with the NSD, and the manager device can retrieve network security information of interest from the one or more supervisor devices which store portions of the information and then aggregate the retrieved information in an appropriate manner.

47 Claims, 29 Drawing Sheets

```
Jun 15 14:28:15 controld: Firebox closed connection. Hard Close.
Jun 15 14:28:18 controld: WatchGuard controld 3.00.B120 (C) 1996-1998 Watchguard Technologies
Jun 15 14:28:10 10.1.1.1 vpnd [47]: WatchGuard vpnd v3.00.B120 (C) 1996-1998 WGTI
Jun 15 14:28:10 10.1.1.1 vpnd [47]: No VPN devices configured... exiting.
Jun 15 14:28:10 10.1.1.1 firewalld [48]: Explicitly set external interface was "", auto-detected "eth0"
Jun 15 14:28:10 10.1.1.1 init [1]: WatchGuard Init Copyright (C) 1996-1998 Watchguard Technologies
Jun 15 14:28:10 10.1.1.1 kernel: Low memory threshhold at 95/90/88 percent.
Jun 15 14:28:10 10.1.1.1 kernel: Console: 16 point font, 400 scans
Jun 15 14:28:10 10.1.1.1 kernel: Console: colour VGA+80x25, 1 virtual console (max 63)
Jun 15 14:28:10 10.1.1.1 kernel: pcibios_init : BIOS32 Service Directory structure at 0x000fadc0
Jun 15 14:28:10 10.1.1.1 kernel: pcibios_init : BIOS32 Service Directory entry at 0xfb230
Jun 15 14:28:10 10.1.1.1 kernel: pcibios_init : PCI BIOS revision 2.10 entry at 0xfb260
Jun 15 14:28:10 10.1.1.1 kernel: Probing PCI hardware.
Jun 15 14:28:10 10.1.1.1 kernel: Warning : Unknown PCI device (1023 : 9660). Please read include/linux/pci.h
Jun 15 14:28:10 10.1.1.1 kernel: Calibrating delay loop.. ok -35.94 BogoMIPS
Jun 15 14:28:10 10.1.1.1 kernel: Memory: 15000k/16384k available (540k kernel code, 384k reserved, 460k data)
Jun 15 14:28:10 10.1.1.1 kernel: Swansea University Computer Society NET3.035 for Linux 2.0
Jun 15 14:28:10 10.1.1.1 kernel: NET3: Unix domain sockets 0.13 for Linux NET3.035.
Jun 15 14:28:10 10.1.1.1 kernel: Swansea University Computer Society TCP/IP for NET3.034
Jun 15 14:28:10 10.1.1.1 kernel: IP Protocols: ICMP, GRE, UDP, TCP
Jun 15 14:28:10 10.1.1.1 kernel: Checking 3861387 coupling... Ok, fpu using exception 16 error
Jun 15 14:28:10 10.1.1.1 kernel: Checking 'hlt' instruction... Ok.
Jun 15 14:28:10 10.1.1.1.1 kernel: Intel Pentium with F0 0F bug - workaround enabled.
Jun 15 14:28:10 10.1.1.1 kernel: alias mapping IDT readonly........ done
Jun 15 14:28:10 10.1.1.1 kernel: Linux version 2.0.33 (bryan@terror) (gcc version 2.7.2.1) #1 Wed Apr 22 12:00:23 PDT 1998
Jun 15 14:28:10 10.1.1.1 kernel: Starting kswapd v 1.2
Jun 15 14:28:10 10.1.1.1 kernel: Serial driver version 4.13 with no serial options enabled
Jun 15 14:28:10 10.1.1.1 kernel: tty00 at 0x03f8 (irq=4) is a 16550A
Jun 15 14:28:10 10.1.1.1 kernel: tty01 at 0x02f8 (irq=3) is a 16550A
Jun 15 14:28:10 10.1.1.1 kernel: Real Time Clock Driver v1.07
Jun 15 14:28:10 10.1.1.1 kernel: Ramdisk driver initialized : 16 ramdisks of 4096K size
Jun 15 14:28:10 10.1.1.1 kernel: Floppy drive(s) : fd0 is 1.44M
```

*FIG. 4A*

```
Jun 15 14:28:10 10.1.1.1 kernel: FDC 0 is an 8272A
Jun 15 14:28:10 10.1.1.1 kernel: eth0: 3c509 at 0x300 tag 1, 10baseT port, address 00 60 97 97 a3 06, IRQ 9.
Jun 15 14:28:10 10.1.1.1 kernel: 3c509.c:1.12 6/4/97 becker@cesdis.gsfc.nasa.gov
Jun 15 14:28:10 10.1.1.1 kernel: eth1: 3c509 at 0x320 tag 2, 10baseT port, address 00 60 97 a9 c1 42, IRQ 10.
Jun 15 14:28:10 10.1.1.1 kernel: 3c509.c:1.12 6/4/97 becker@cesdis.gsfc.nasa.gov
Jun 15 14:28:10 10.1.1.1 kernel: eth2: 3c509 at 0x340 tag 3, 10baseT port, address 00 60 97 ad c5 2b, IRQ 11.
Jun 15 14:28:10 10.1.1.1 kernel: 3c509.c:1.12 6/4/97 becker@cesdis.gsfc.nasa.gov
Jun 15 14:28:10 10.1.1.1 kernel: VFS: Disk change detected on device 02:00
Jun 15 14:28:10 10.1.1.1 kernel: RAMDISK: Compressed image found at block 440
Jun 15 14:28:10 10.1.1.1 kernel: VFS: Mounted root (minix filesystem) readonly.
Jun 15 14:28:10 10.1.1.1 kernel: WatchGuard Driver v3.00.B120 (C) 1995-1998 WGTI
Jun 15 14:28:10 10.1.1.1 firewalld [48]: new outside interface is eth0
Jun 15 14:28:10 10.1.1.1 firewalld [48]: Starting child /bin/server
Jun 15 14:28:11 10.1.1.1 firewalld [48]: Starting child /opt/bin/tunneld
Jun 15 14:28:11 10.1.1.1 h323 [52]: WatchGuard h323 v3.00.B120 (C) 1998 WGTI
Jun 15 14:28:11 10.1.1.1 sw-proxy [53]: streamworks-proxy launched
Jun 15 14:28:11 10.1.1.1 firewalld [48]: Starting child /opt/bin/webblocker
Jun 15 14:28:11 10.1.1.1 kernel: WG: reset
Jun 15 14:28:11 10.1.1.1 firewalld [48]: Couldn't find property options.portfwd.hosts, returning ""
Jun 15 14:28:11 10.1.1.1 dce_rpc [54]: WatchGuard dce_rpc v3.00.B120 (C) 1998 WGTI
Jun 15 14:28:12 10.1.1.1 tunneld [56]: WatchGuard PPTP-tunneld v3.00.B120 (C) 1997-1998 WGTI
Jun 15 14:28:12 10.1.1.1 kernel: PPTP: version 1.0.0 (For export)
Jun 15 14:28:12 10.1.1.1 kernel: MPPC: will not compress outgoing packets
Jun 15 14:28:12 10.1.1.1 tunneld [56]: added 1 pptp interfaces
Jun 15 14:28:12 10.1.1.1 tunneld [56]: software compression will not be negotiated
Jun 15 14:28:12 10.1.1.1 nbrecast [60]: WatchGuard NBRecast v3.00.B120 (C) 1998 WGTI
Jun 15 14:28:12 10.1.1.1 tunneld [61]: messenger_init: using syslog as printer (with LOG_WARNING level)
Jun 15 14:28:12 10.1.1.1 tunneld [61]: messenger_init: will read from /tmp/message.61 file
Jun 15 14:28:12 10.1.1.1 firewalld [48]: WatchGuard Daemon, v3.00.B120 (C) 1996-1998 WGTI
Jun 15 14:28:12 10.1.1.1 firewalld [48]: Couldn't connect daytime socket (Connection refused)
Jun 15 14:28:12 10.1.1.1 firewalld [48]: Childmax is 490
Jun 15 14:28:12 10.1.1.1 firewalld [48]: Pid 57, exit status 0
```

*FIG. 4B*

```
Jun 15 14:28:12 10.1.1.1 firewalld [48]: Pid 56, exit status 0
Jun 15 14:28:12 10.1.1.1 http-proxy [58]: WatchGuard HTTP proxy v3.00.B120 (C) 1996-1998 WGTI
Jun 15 14:28:17 10.1.1.1 authentication [55]: WatchGuard authentication v3.00.B120 (C) 1998 WGTI
Jun 15 14:28:25 10.1.1.1 fwcheck [51]: fwcheck (C) 1998 WGTI
Jun 15 14:28:53 10.1.1.1 firewalld [48]: deny in eth0 46 9 20 2 208.152.24.30 255.255.255.255 (default)
Jun 15 14:30:08 10.1.1.1 firewalld [48]: deny in eth0 46 9 20 2 208.152.24.30 255.255.255.255 (default)
Jun 15 14:31:29 10.1.1.1 firewalld [48]: deny in eth0 46 9 20 2 208.152.24.30 255.255.255.255 (default)
Jun 15 14:32:52 10.1.1.1 firewalld [48]: deny in eth0 46 9 20 2 208.152.24.30 255.255.255.255 (default)
Jun 15 14:33:08 10.1.1.1 http-proxy [78]: [10.1.1.15:1094 204.202.129.247:80/java/ScorePost.zip] Response from 204.202.129.247:80/java/scorepost.zip denied: Unsafe content type "application/zip"
Jun 15 14:33:08 10.1.1.1 http-proxy [79]: [10.1.1.15:1095 204.202.129.247:80/java/starwave/sportszone/scorepost/ScorePost.class] Response from 204.202.129.247:80/java/starwave/sportszone/scorepost/scorepost.class denied: Unsafe content type
Jun 15 14:33:08 10.1.1.1 http-proxy [80]: [10.1.1.15:1096 204.202.129.230:80/javanew/lw_ticker/LWScroller.class] Response from 204.202.129.230:80/javanew/lw_ticker/lwscroller.class denied: Unsafe applet
Jun 15 14:34:21 10.1.1.1 firewalld [48]: deny in eth0 46 9 20 2 208.152.24.30 255.255.255.255 (default)
Jun 15 14:35:42 10.1.1.1 firewalld [48]: deny in eth0 46 9 20 2 208.152.24.30 255.255.255.255 (default)
Jun 15 14:37:01 10.1.1.1 firewalld [48]: deny in eth0 46 9 20 2 208.152.24.30 255.255.255.255 (default)
Jun 15 14:38:22 10.1.1.1 firewalld [48]: deny in eth0 46 9 20 2 208.152.24.30 255.255.255.255 (default)
Jun 15 14:39:51 10.1.1.1 firewalld [48]: deny in eth0 46 9 20 2 208.152.24.30 255.255.255.255 (default)
Jun 15 14:41:17 10.1.1.1 firewalld [48]: deny in eth0 46 9 20 2 208.152.24.30 255.255.255.255 (default)
Jun 15 14:42:30 10.1.1.1 firewalld [48]: deny in eth0 46 9 20 2 208.152.24.30 255.255.255.255 (default)
Jun 15 14:43:45 10.1.1.1 firewalld [48]: deny in eth0 46 9 20 2 208.152.24.30 255.255.255.255 (default)
Jun 15 14:45:10 10.1.1.1 firewalld [48]: deny in eth0 46 9 20 2 208.152.24.30 255.255.255.255 (default)
Jun 15 14:46:38 10.1.1.1 firewalld [48]: deny in eth0 46 9 20 2 208.152.24.30 255.255.255.255 (default)
Jun 15 14:48:00 10.1.1.1 firewalld [48]: deny in eth0 46 9 20 2 208.152.24.30 255.255.255.255 (default)
Jun 15 14:49:28 10.1.1.1 firewalld [48]: deny in eth0 46 9 20 2 208.152.24.30 255.255.255.255 (default)
Jun 15 14:50:42 10.1.1.1 firewalld [48]: deny in eth0 46 9 20 2 208.152.24.30 255.255.255.255 (default)
Jun 15 14:51:58 10.1.1.1 firewalld [48]: deny in eth0 46 9 20 2 208.152.24.30 255.255.255.255 (default)
Jun 15 14:53:11 10.1.1.1 firewalld [48]: deny in eth0 46 9 20 2 208.152.24.30 255.255.255.255 (default)
Jun 15 14:54:36 10.1.1.1 firewalld [48]: deny in eth0 46 9 20 2 208.152.24.30 255.255.255.255 (default)
Jun 15 14:55:53 10.1.1.1 firewalld [48]: deny in eth0 46 9 20 2 208.152.24.30 255.255.255.255 (default)
Jun 15 14:57:23 10.1.1.1 firewalld [48]: deny in eth0 46 9 20 2 208.152.24.30 255.255.255.255 (default)
```

FIG. 4C

```
Jun 15 14:57:57 10.1.1.1 firewalld [48]: deny in eth0 44 tcp 20 63 208.152.24.33 208.152.24.23 3946 113 syn (default)
Jun 15 14:58:35 10.1.1.1 firewalld [48]: deny in eth0 46 9 20 2 208.152.24.30 255.255.255.255 (default)
Jun 15 15:00:04 10.1.1.1 firewalld [48]: deny in eth0 46 9 20 2 208.152.24.30 255.255.255.255 (default)
Jun 15 15:01:29 10.1.1.1 firewalld [48]: deny in eth0 46 9 20 2 208.152.24.30 255.255.255.255 (default)
Jun 15 15:02:49 10.1.1.1 firewalld [48]: deny in eth0 46 9 20 2 208.152.24.30 255.255.255.255 (default)
Jun 15 15:04:14 10.1.1.1 firewalld [48]: deny in eth0 46 9 20 2 208.152.24.30 255.255.255.255 (default)
Jun 15 15:05:39 10.1.1.1 firewalld [48]: deny in eth0 46 9 20 2 208.152.24.30 255.255.255.255 (default)
Jun 15 15:05:54 10.1.1.1 http-proxy [205]: [10.1.1.15:1144
   208.134.241.152:80/Params.richmedia=yes&uniqueID=homepage.main.0&GroupID=400&PagePos=1] Response from
   208.134.241.152:80/js.ng/params.richmedia=yes&uniqueid=homepage.main.0&grou
Jun 15 15:06:10 10.1.1.1 http-proxy [209]: [10.1.1.15:1148
   208.134.241.152:80/Params.richedia=yes&uniqueID=homepage.main.0&GroupID=400&PagePos=1] Response from
   208.134.241.152:80/js.ng/params.richedia=yes&uniqueid=homepage.main.0&grou
Jun 15 15:06:10 10.1.1.1 http-proxy [210]: [10.1.1.15:1149 208.134.241.155:80/homepage/pics/forecasts_conditions_450.gif] Can't
   send data to client (Broken pipe)
Jun 15 15:06:10 10.1.1.1 http-proxy [208]: [10.1.1.15:1147 208.134.241.155:80/breaking_weather/live_story/pics/hmpg_image.jpg]
   Can't send data to client (Broken pipe)
Jun 15 15:06:10 10.1.1.1 http-proxy [211]: [10.1.1.15:1150 208.134.241.155:80] relaying connection-reset (on read) from client
Jun 15 15:07:06 10.1.1.1 http-proxy [262]: [10.1.1.15:1207 204.133.127.77:80/java/Ticker.class] Response from
   204.133.127.77:80/java/ticker.class denied: Unsafe applet
Jun 15 15:07:08 10.1.1.1 firewalld [48]: deny in eth0 46 9 20 2 208.152.24.30 255.255.255.255 (default)
Jun 15 15:08:35 10.1.1.1 firewalld [48]: deny in eth0 46 9 20 2 208.152.24.30 255.255.255.255 (default)
Jun 15 15:09:50 10.1.1.1 firewalld [48]: deny in eth0 46 9 20 2 208.152.24.30 255.255.255.255 (default)
Jun 15 15:09:59 10.1.1.1 http-proxy [309]:[10.1.1.17:1074 206.35.113.28:80/F/OCVscroll.class] Response from
   206.35.113.28:80/f/ocvscroll.class denied: Unsafe content type "application/octet-stream"
Jun 15 15:10:00 10.1.1.1 http-proxy [310]: [10.1.1.17:1075 206.35.113.28:80/F/resbar.gif] Can't send data to client (Broken pipe)
Jun 15 15:10:00 10.1.1.1 http-proxy [311]: [10.1.1.17:1076 206.35.113.28:80/F/331.gif] Can't send data to client (Broken pipe)
Jun 15 15:10:00 10.1.1.1 http-proxy [312]: [10.1.1.17:1077 206.35.113.28:80/F/copyrigh.gif] Can't send data to client (Broken pipe)
Jun 15 15:10:00 10.1.1.1 http-proxy [313]: [10.1.1.17:1078 206.35.113.28:80] relaying connection-reset (on read) from client
Jun 15 15:11:03 10.1.1.1 firewalld [48]: deny in eth0 46 9 20 2 208.152.24.30 255.255.255.255 (default)
Jun 15 15:12:19 10.1.1.1 firewalld [48]: deny in eth0 46 9 20 2 208.152.24.30 255.255.255.255 (default)
Jun 15 15:13:32 10.1.1.1 firewalld [48]: deny in eth0 46 9 20 2 208.152.24.30 255.255.255.255 (default)
```

*FIG. 4D*

```
Jun 15 15:13:53 10.1.1.1 http-proxy [336]: [10.1.1.21:1034 206.69.91.100:80/neonews/Scroll.class] Response from
    206.69.91.100:80/neonews/scroll.class denied: Unsafe applet
Jun 15 15:14:21 10.1.1.1 http-proxy [349]: [10.1.1.21:1048 141.142.3.70:80/java/mamagator.class] Response from
    141.142.3.70:80/java/mamagator.class denied: Unsafe content type "application/octet-stream"
Jun 15 15:14:54 10.1.1.1 firewalld [48]: deny in eth0 46 9 20 2 208.152.24.30 255.255.255.255 (default)
Jun 15 15:16:12 10.1.1.1 firewalld [48]: deny in eth0 46 9 20 2 208.152.24.30 255.255.255.255 (default)
Jun 15 15:17:29 10.1.1.1 firewalld [48]: deny in eth0 46 9 20 2 208.152.24.30 255.255.255.255 (default)
Jun 15 15:18:53 10.1.1.1 firewalld [48]: deny in eth0 46 9 20 2 208.152.24.30 255.255.255.255 (default)
Jun 15 15:19:58 10.1.1.1 http-proxy [382]: [10.1.1.19:1027 207.25.71.22:80/virtual/1998/code/cnn.js] Response from
    207.25.71.22:80/virtual/1998/code/cnn.js denied: Unsafe content type "application/x-javascript"
Jun 15 15:20:11 10.1.1.1 firewalld [48]: deny in eth0 46 9 20 2 208.152.24.30 255.255.255.255 (default)
Jun 15 15:20:28 10.1.1.1 http-proxy [393]: [10.1.1.19:1041 204.152.178.145:80/phrack52.tar.gz] Response from
    204.152.178.145:80/phrack52.tar.gz denied: Unsafe content type "application/x-tar"
Jun 15 15:21:37 10.1.1.1 firewalld [48]: deny in eth0 46 9 20 2 208.152.24.30 255.255.255.255 (default)
Jun 15 15:22:52 10.1.1.1 firewalld [48]: deny in eth0 46 9 20 2 208.152.24.30 255.255.255.255 (default)
Jun 15 15:24:12 10.1.1.1 firewalld [48]: deny in eth0 46 9 20 2 208.152.24.30 255.255.255.255 (default)
Jun 15 15:25:36 10.1.1.1 firewalld [48]: deny in eth0 46 9 20 2 208.152.24.30 255.255.255.255 (default)
Jun 15 15:27:03 10.1.1.1 firewalld [48]: deny in eth0 4o 9 20 2 208.152.24.30 255.255.255.255 (default)
Jun 15 15:28:21 10.1.1.1 firewalld [48]: deny in eth0 46 9 20 2 208.152.24.30 255.255.255.255 (default)
Jun 15 15:29:37 10.1.1.1 firewalld [48]: deny in eth0 46 9 20 2 208.152.24.30 255.255.255.255 (default)
Jun 15 15:30:51 10.1.1.1 firewalld [48]: deny in eth0 46 9 20 2 208.152.24.30 255.255.255.255 (default)
Jun 15 15:31:03 10.1.1.1 firewalld [48]: deny in eth0 44 tcp 20 63 208.152.24.33 208.152.24.23 4124 113 syn (default)
Jun 15 15:32:20 10.1.1.1 firewalld [48]: deny in eth0 46 9 20 2 208.152.24.30 255.255.255.255 (default)
Jun 15 15:33:33 10.1.1.1 firewalld [48]: deny in eth0 46 9 20 2 208.152.24.30 255.255.255.255 (default)
Jun 15 15:34:48 10.1.1.1 firewalld [48]: deny in eth0 46 9 20 2 208.152.24.30 255.255.255.255 (default)
Jun 15 15:36:02 10.1.1.1 firewalld [48]: deny in eth0 46 9 20 2208.152; 24.30 255.255.255.255 (default)
Jun 15 15:37:21 10.1.1.1 firewalld [48]: deny in eth0 46 9 20 2 208.152.24.30 255.255.255.255 (default)
Jun 15 15:37:39 10.1.1.1 firewalld [48]: deny in eth0 56 icmp 20 255 208.152.24.30 208.152.24.23 5 1 (default)
Jun 15 15:38:44 10.1.1.1 firewalld [48]: deny in eth0 46 9 20 2 208.152.24.30 255.255.255.255 (default)
Jun 15 15:40:00 10.1.1.1 firewalld [48]: deny in eth0 46 9 20 2 208.152.24.30 255.255.255.255 (default)
Jun 15 15:41:22 10.1.1.1 firewalld [48]: deny in eth0 46 9 20 2 208.152.24.30 255.255.255.255 (default)
Jun 15 15:41:55 10.1.1.1 http-proxy [585]: [10.1.1.20:1029 192.215.74.11:80] relaying connection-reset (on read) from client
```

FIG. 4E

```
Jun 15 15:42:45 10.1.1.1 firewalld [48]: deny in eth0 46 9 20 2 208.152.24.30 255.255.255.255 (default)
Jun 15 15:44:10 10.1.1.1 firewalld [48]: deny in eth0 46 9 20 2 208.152.24.30 255.255.255.255 (default)
Jun 15 15:45:33 10.1.1.1 firewalld [48]: deny in eth0 46 9 20 2 208.152.24.30 255.255.255.255 (default)
Jun 15 15:46:43 10.1.1.1 http-proxy[610]: [10.1.1.25:1030 209.67.29.11:80/java/NewsTicker/NewsTicker1.class] Response from
   209.67.29.11:80/java/newsticker/newsticker1.class denied: Unsafe applet
Jun 15 15:46:48 10.1.1.1 firewalld [48]: deny in eth0 46 9 20 2 208.152.24.30 255.255.255.255 (default)
Jun 15 15:46:54 10.1.1.1 http-proxy [617]: [10.1.1.25:1037 209.67.29.11:80] relaying connection-reset (on read) from client
Jun 15 15:46:55 10.1.1.1 http-proxy [627]: [10.1.1.25:1047 209.67.29.11:80] relaying connection-reset (on read) from client
Jun 15 15:48:09 10.1.1.1 firewalld [48]: deny in eth0 46 9 20 2 208.152.24.30 255.255.255.255 (default)
Jun 15 15:49:34 10.1.1.1 firewalld [48]: deny in eth0 46 9 20 2 208.152.24.30 255.255.255.255 (default)
Jun 15 15:51:03 10.1.1.1 firewalld [48]: deny in eth0 46 9 20 2 208.152.24.30 255.255.255.255 (default)
Jun 15 15:52:04 10.1.1.1 http-proxy [670]: [10.1.1.30:1061 206.99.97.11:80] connection timed out: exiting
Jun 15 15:52:18 10.1.1.1 firewalld [48]: deny in eth0 46 9 20 2 208.152.24.30 255.255.255.255 (default)
Jun 15 15:53:31 10.1.1.1 firewalld [48]: deny in eth0 46 9 20 2 208.152.24.30 255.255.255.255 (default)
Jun 15 15:54:36 10.1.1.1 http-proxy [704]: [10.1.1.30:1096 206.99.97.11:80] connection timed out: exiting
Jun 15 15:56:19 10.1.1.1 firewalld [48]: deny in eth0 46 9 20 2 208.152.24.30 255.255.255.255
Jun 15 15:57:46 10.1.1.1 firewalld [48]: deny in eth0 46 9 20 2 208.152.24.30 255.255.255.255
Jun 15 15:59:09 10.1.1.1 firewalld [48]: deny in eth0 46 9 20 2 208.152.24.30 255.255.255.255
Jun 15 16:00:24 10.1.1.1 firewalld [48]: deny in eth0 46 9 20 2 208.152.24.30 255.255.255.255
Jun 15 16:01:42 10.1.1.1 firewalld [48]: deny in eth0 46 9 20 2 208.152.24.30 255.255.255.255
Jun 15 16:03:01 10.1.1.1 firewalld [48]: deny in eth0 46 9 20 2 208.152.24.30 255.255.255.255
Jun 15 16:04:22 10.1.1.1 firewalld [48]: deny in eth0 46 9 20 2 208.152.24.30 255.255.255.255
Jun 15 16:04:25 10.1.1.1 http-proxy [763]: [10.1.1.24:1047 168.100.205.221:80] relaying connection-reset (on read) from client
Jun 15 16:05:39 10.1.1.1 firewalld [48]: deny in eth0 46 9 20 2 208.152.24.30 255.255.255.255 (default)
Jun 15 16:07:08 10.1.1.1 firewalld [48]: deny in eth0 46 9 20 2 208.152.24.30 255.255.255.255 (default)
Jun 15 16:08:31 10.1.1.1 firewalld [48]: deny in eth0 46 9 20 2 208.152.24.30 255.255.255.255 (default)
Jun 15 16:09:22 10.1.1.1 firewalld [48]: deny in eth0 44 tcp 20 53 198.245.206.12 208.152.24.23 1024 4102 syn (default)
Jun 15 16:09:25 10.1.1.1 firewalld [48]: deny in eth0 44 tcp 20 53 198.245.206.12 208.152.24.23 1024 4102 syn (default)
Jun 15 16:09:52 10.1.1.1 firewalld [48]: deny in eth0 44 tcp 20 53 198.245.206.12 208.152.24.23 1030 4102 syn (default)
Jun 15 16:09:55 10.1.1.1 firewalld [48]: deny in eth0 46 9 20 2 208.152.24.30 255.255.255.255 (default)
Jun 15 16:10:22 10.1.1.1 firewalld [48]: deny in eth0 44 tcp 20 53 198.245.206.12 208.152.24.23 1031 4102 syn (default)
```

*FIG. 4F*

```
Jun 15 16:10:52 10.1.1.1 firewalld [48]: deny in eth0 44 tcp 20 53 198.245.206.12 208.152.24.23 1037 4102 syn (default)
Jun 15 16:11:22 10.1.1.1 firewalld [48]: deny in eth0 44 tcp 20 53 198.245.206.12 208.152.24.23 1090 4102 syn (default)
Jun 15 16:11:25 10.1.1.1 firewalld [48]: deny in eth0 46 9 20 2 208.152.24.30 255.255.255.255 (default)
Jun 15 16:11:52 10.1.1.1 firewalld [48]: deny in eth0 44 tcp 20 53 198.245.206.12 208.152.24.23 1095 4102 syn (default)
Jun 15 16:12:22 10.1.1.1 firewalld [48]: deny in eth0 44 tcp 20 53 198.245.206.12 208.152.24.23 1096 4102 syn (default)
Jun 15 16:12:52 10.1.1.1 firewalld [48]: deny in eth0 44 tcp 20 53 198.245.206.12 208.152.24.23 1152 4102 syn (default)
Jun 15 16:12:55 10.1.1.1 firewalld [48]: deny in eth0 46 9 20 2 208.152.24.30 255.255.255.255 (default)
Jun 15 16:13:08 10.1.1.1 http-proxy [825]: [10.1.1.23:1042 204.202.129.247:80/java/ScorePost.zip] Response from
   204.202.129.247:80/java/scorepost.zip denied: Unsafe content type "application/zip"
Jun 15 16:13:09 10.1.1.1 http-proxy [826]: [10.1.1.23:1043 204.202.129.247:80/java/starwave/sportszone/scorepost/ScorePost.class]
   Response from 204.202.129.247:80/java/starwave/sportszone/scorepost/scorepost.class denied: Unsafe content type
Jun 15 16:13:09 10.1.1.1 http-proxy [827]: [10.1.1.23:1044 204.202.129.230:80/javanew/lw_ticker/LWScroller.class] Response from
   204.202.129.230:80/javanew/lw_ticker/lwscroller.class denied: Unsafe applet
Jun 15 16:13:22 10.1.1.1 firewalld [48]: deny in eth0 44 tcp 20 53 198.245.206.12 208.152.24.23 1216 4102 syn (default)
Jun 15 16:13:52 10.1.1.1 firewalld [48]: deny in eth0 44 tcp 20 53 198.245.206.12 208.152.24.23 1283 4102 syn (default)
Jun 15 16:14:20 10.1.1.1 firewalld [48]: deny in eth0 46 9 20 2 208.152.24.30 255.255.255.255 (default)
Jun 15 16:14:22 10.1.1.1 firewalld [48]: deny in eth0 44 tcp 20 53 198.245.206.12 208.152.24.23 1284 4102 syn (default)
Jun 15 16:14:52 10.1.1.1 firewalld [48]: deny in eth0 44 tcp 20 53 198.245.206.12 208.152.24.23 1285 4102 syn (default)
Jun 15 16:15:22 10.1.1.1 firewalld [48]: deny in eth0 44 tcp 20 53 198.245.206.12 208.152.24.23 1286 4102 syn (default)
Jun 15 16:15:37 10.1.1.1 firewalld [48]: deny in eth0 46 9 20 2 208.152.24.30 255.255.255.255 (default)
Jun 15 16:15:52 10.1.1.1 firewalld [48]: deny in eth0 44 tcp 20 53 198.245.206.12 208.152.24.23 1287 4102 syn (default)
Jun 15 16:16:22 10.1.1.1 firewalld [48]: deny in eth0 44 tcp 20 53 198.245.206.12 208.152.24.23 1288 4102 syn (default)
Jun 15 16:16:52 10.1.1.1 firewalld [48]: deny in eth0 44 tcp 20 53 198.245.206.12 208.152.24.23 1294 4102 syn (default)
Jun 15 16:17:02 10.1.1.1 firewalld [48]: deny in eth0 46 9 20 2 208.152.24.30 255.255.255.255 (default)
Jun 15 16:17:22 10.1.1.1 firewalld [48]: deny in eth0 44 tcp 20 53 198.245.206.12 208.152.24.23 1297 4102 syn (default)
Jun 15 16:17:52 10.1.1.1 firewalld [48]: deny in eth0 44 tcp 20 53 198.245.206.12 208.152.24.23 1298 4102 syn (default)
Jun 15 16:18:22 10.1.1.1 firewalld [48]: deny in eth0 44 tcp 20 53 198.245.206.12 208.152.24.23 1361 4102 syn (default)
Jun 15 16:18:31 10.1.1.1 firewalld [48]: deny in eth0 46 9 20 2 208.152.24.30 255.255.255.255 (default)
Jun 15 16:18:52 10.1.1.1 firewalld [48]: deny in eth0 44 tcp 20 53 198.245.206.12 208.152.24.23 1362 4102 syn (default)
Jun 15 16:19:22 10.1.1.1 firewalld [48]: deny in eth0 44 tcp 20 53 198.245.206.12 208.152.24.23 1424 4102 syn (default)
Jun 15 16:19:49 10.1.1.1 firewalld [48]: deny in eth0 46 9 20 2 208.152.24.30 255.255.255.255 (default)
Jun 15 16:19:52 10.1.1.1 firewalld [48]: deny in eth0 44 tcp 20 53 198.245.206.12 208.152.24.23 1488 4102 syn (default)
```

*FIG. 4G*

```
Jun 15 16:20:22 10.1.1.1 firewalld [48]: deny in eth0 44 tcp 20 53 198.245.206.12 208.152.24.23 1559 4102 syn (default)
Jun 15 16:20:52 10.1.1.1 firewalld [48]: deny in eth0 44 tcp 20 53 198.245.206.12 208.152.24.23 1563 4102 syn (default)
Jun 15 16:21:04 10.1.1.1 firewalld [48]: deny in eth0 46 9 20 2 208.152.24.30 255.255.255.255 (default)
Jun 15 16:21:22 10.1.1.1 firewalld [48]: deny in eth0 44 tcp 20 53 198.245.206.12 208.152.24.23 1564 4102 syn (default)
Jun 15 16:21:52 10.1.1.1 firewalld [48]: deny in eth0 44 tcp 20 53 198.245.206.12 208.152.24.23 1565 4102 syn (default)
Jun 15 16:22:22 10.1.1.1 firewalld [48]: deny in eth0 44 tcp 20 53 198.245.206.12 208.152.24.23 1567 4102 syn (default)
Jun 15 16:22:29 10.1.1.1 firewalld [48]: deny in eth0 46 9 20 2 208.152.24.30 255.255.255.255 (default)
Jun 15 16:22:52 10.1.1.1 firewalld [48]: deny in eth0 44 tcp 20 53 198.245.206.12 208.152.24.23 1569 4102 syn (default)
Jun 15 16:23:53 controld: Error: Connection reset by peer. Receive: error #10054
Jun 15 16:23:57 controld: WatchGuard controld 3.00.B120 (C) 1996-1998 Watchguard Technologies
Jun 11 02:43:58 198.245.206.12 firewalld [49]: deny in eth1 242 udp 20 32 198.245.206.208 198.245.206.255 138 138 (SMB)
Jun 15 16:24:13 controld: WatchGuard controld 3.00.B120 (C) 1996-1998 Watchguard Technologies
```

*FIG. 4H*

MANAGING MULTIPLE NETWORK SECURITY DEVICES FROM A MANAGER DEVICE

TECHNICAL FIELD

The present invention relates generally to communicating information between computers, and more particularly to using a manager device to remotely manage multiple network security devices.

BACKGROUND OF THE INVENTION

As computer systems and other network devices (e.g., printers, modems, and scanners) have become increasingly interconnected, it is increasingly important to protect sensitive information (e.g., confidential business data, access information such as passwords, or any type of data stored on certain devices) stored on one network device from unauthorized retrieval by other network devices. The prevalence of the Internet and the growth of the World Wide Web have only exacerbated this issue.

One way to address this issue involves the use of network security devices ("NSDs") which attempt to control the spread of sensitive information so that only authorized users or devices can retrieve such information. Some types of NSDs, such as firewalls and security appliances, have a group of one or more trusted network devices (or networks consisting of trusted network devices) which the NSD attempts to protect from unauthorized external access. These NSDs monitor network information passing between external network devices and the devices in their group of trusted or internal devices. In addition, these NSDs typically implement a specified security policy by preventing the passage of unauthorized network information between the external and the trusted devices.

Those skilled in the art will appreciate that network information can be transmitted in a variety of formats. For example, network information is often transmitted as a series of individual packets of information, such as TCP/IP (Transfer Control Protocol/Internet Protocol) packets. While such packets will typically include the network address (e.g., IP address) of the device to receive the information, other data about the network information (e.g., the specific type of information being requested or sent) may be difficult to ascertain.

While a properly configured NSD can protect information stored on or accessible from trusted devices, it can be difficult to configure NSDs so that they correctly implement the desired security policies. One source of difficulty in configuring NSDs arises from the large number of types of network information which may be encountered. For example, there are a large number of network services and protocols which external devices may attempt to provide to trusted devices or access from trusted devices.

Such network services and protocols include, but are not limited to, Archie, auth (ident), DCE-RPC (Distributed Computing Environment Remote Procedure Call), DHCP (Dynamic Host Configuration Protocol) Client and Server, DNS (Domain Name Service), finger, FTP (File Transfer Protocol), gopher, H.323, HTTP (HyperText Transfer Protocol), Filtered-HTTP, Proxied-HTTP, ICMP (Internet Control Message Protocol), NNTP (Network News Transfer Protocol), NTP (Network Time Protocol), ping, POP (Post Office Protocol) 2 and 3, RealNetworks, rlogin, rsh (Remote SHell), SMB (Simple Block Messaging), SMTP (Simple Mail Transfer Protocol), SNMP (Simple Network Management Protocol), syslog, ssh (Secure SHell), StreamWorks, TCP/IP, telnet, Time, traceroute, UDP (User Datagram Protocol), VDOLive, WAIS (Wide Area Information Services), whois, and other device-specific services. Those skilled in the art will appreciate the uses and details of these services and protocols, including the device ports typically used with the services and protocols and the specified format for such information (e.g., the TCP/IP packet definition).

Another source of difficulty in configuring NSDs arises from the variety of ways to handle network information of different types. For example, for each type of service or protocol, a NSD may wish to take different actions for (e.g., allow passage of, deny passage of, or otherwise manipulate) the corresponding network information of that service or protocol. The decision to take these different actions can also be based on additional factors such as the direction of information flow (i.e., whether the network information is passing from a trusted device or to a trusted device) or on the basis of the sender or the intended recipient of the information (e.g., whether the network information is passing from or to specific network devices or is passing from or to any network device of a specified class, such as any external device).

The types of actions to be taken for the monitored network information (based on the various factors such as the services and protocols being used, the direction of the information flow, and the classes of devices of the sender and the intended recipient) provide an initial incomplete security policy. Various device-specific information is necessary to configure a particular NSD with a specific security policy that can be implemented by the device. The device-specific information which must typically be specified to create a specific security policy includes, for example, the network address of the NSD and the network addresses of some or all of the trusted devices. If a particular network service is to be provided to external devices by a trusted device, such as FTP access, information about the trusted FTP server must also be available to the NSD.

A user such as a system administrator typically defines the specific security policy for a NSD by determining the services and protocols of interest and then configuring the NSD to protect the trusted devices as appropriate. However, configuring an NSD can be time-consuming, and any mistakes in the configuration (e.g., failure to define how a particular service should be handled, or allowing default behaviors to allow passage of network information) can compromise the ability of the NSD to protect sensitive information. Thus, the need for system administrators to configure each NSD can cause various problems.

When it is necessary to configure large numbers of NSDs, such problems are only exacerbated. If the security policies across some or all of the NSDs should be consistent (e.g., multiple devices in use by a single company), the likelihood of mistakes increases. If the system administrator merely copies the specific security policy from one NSD to another, mistakes may occur in re-specifying the various NSD-specific configuration information. Alternately, if the system administrator attempts to re-create the general security policy independently on each NSD, various mistakes may occur such as neglecting to configure a type of service or incorrectly configuring the actions for such a type.

In addition to implementing security policies which may restrict the passage of some network information, NSDs typically gather network security information about events of interest, including encountering types of network information that is encountered as well as various actions taken by the NSD. The network security information can be displayed to users such as system administrators so that they can verify that the security policy is correctly implemented, produce reports about the types and quantities of network information that is allowed to pass and that is blocked from passage, and identify when external activities of concern (e.g., a hacker attack on the NSD) are occurring. NSDs typically maintain a local storage, often referred to as a log, of the security information that they gather.

Some NSDs include computer software components executing on general-purpose or dedicated computer hardware. For such an NSD, the executing software components assist in implementing the specific security policies defined for the NSD. Use of software components allows the operation of the NSD to be upgraded in an efficient manner by replacing some or all of the existing software components with new software components. Such new software is typically distributed via physical media such as CDs or optical disks, and is loaded onto the NSD by an individual such as a system administrator.

SUMMARY OF THE INVENTION

Some embodiments of the present invention provide a facility for using a security policy manager device to remotely manage multiple network security devices (NSDs). In some embodiments, the manager device uses one or more intermediate supervisor devices to assist in the management. Security for the communications between the manager device, supervisor devices, and NSDs can be provided in a variety of ways.

The facility allows the manager device to create a consistent security policy for the multiple NSDs by distributing a copy of a security policy template to each of the NSDs and by then configuring each copy of the template with NSD-specific information. For example, the manager device can distribute the template to multiple NSDs by sending a single copy of the template to a supervisor device associated with the NSDs and by then having the supervisor device update each of the NSDs with a copy of the template. Other information useful for implementing security policies for the NSDs, such as software components to be executed by the NSDs, can also be distributed by the manager device to the NSDs in a similar manner.

The facility also allows a manager device to retrieve, analyze and display the network security information gathered by the various NSDs while implementing security policies. Each NSD can forward its network security information to a supervisor device currently associated with the NSD, and can switch supervisor devices if the current supervisor device becomes unavailable. When the manager device desires the network security information for an NSD, the manager device contacts the one or more supervisor devices which store portions of the network security information of interest, retrieves the various portions of the network security information, and then aggregates the retrieved information in an appropriate manner.

BRIEF DESCRIPTION OF THE DRAWINGS

FIGS. 4A–4H are an example of network security information generated by implementing a specific security policy.

DETAILED DESCRIPTION OF THE INVENTION

Figure 1:
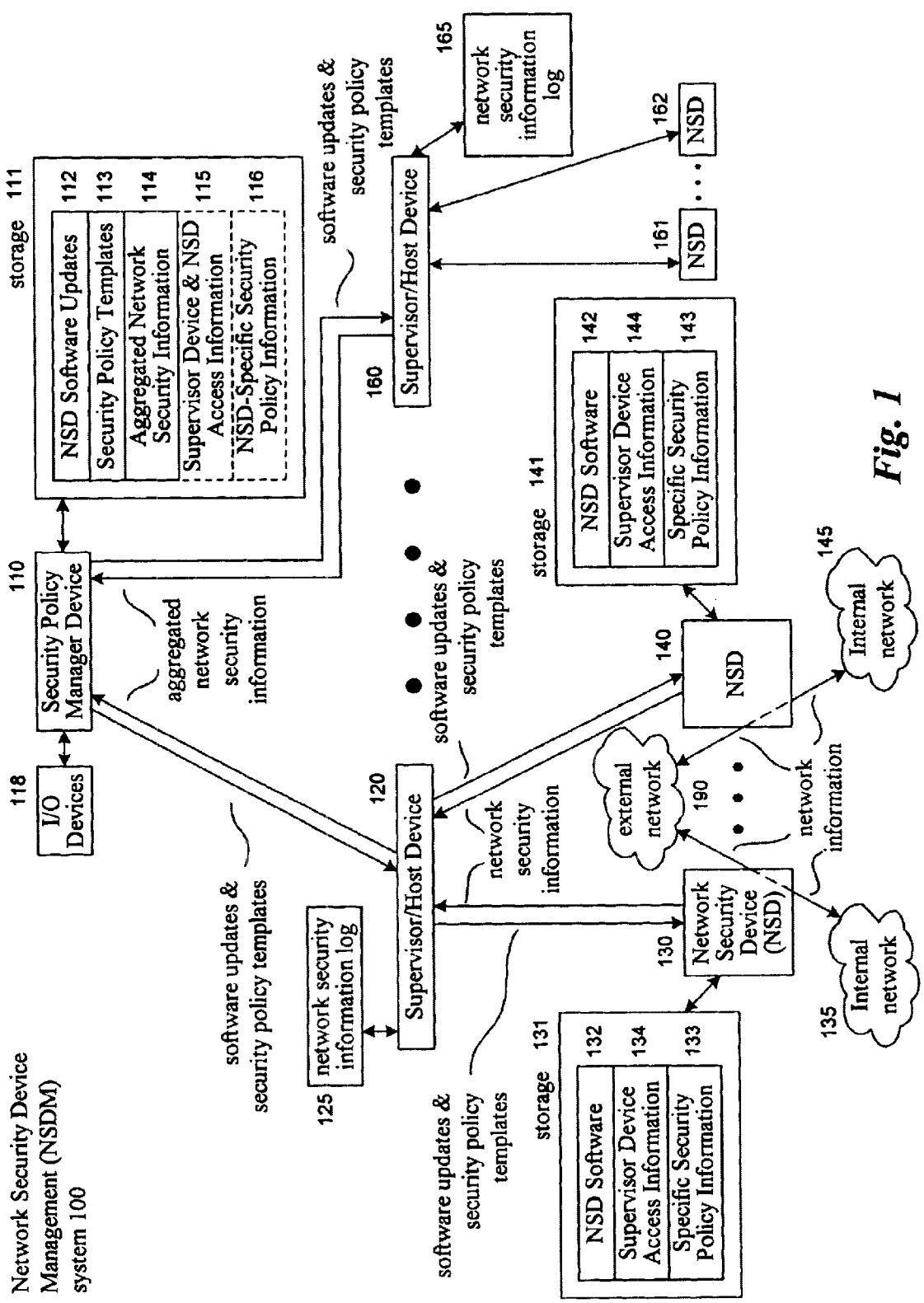
FIG. 1 is a block diagram illustrating an embodiment of the Network Security Device Management (NSDM) system of the present invention.

An embodiment of the present invention provides a method and system for using a manager device to remotely manage multiple network security devices. In particular, the Network Security Device Management (NSDM) system allows a security policy manager device to create a consistent security policy for multiple network security devices (NSDs) by distributing a copy of a security policy template to each of the NSDs and by then configuring each copy of the template with NSD-specific information. Other information useful for implementing security policies for the NSDs, such as software components to be executed by the NSDs or lists of devices from whom information is to be blocked, can also be distributed by the manager device to the NSDs in a similar manner. The NSDM system also allows a manager device to retrieve, analyze and display the network security information gathered by the various NSDs while implementing security policies. In some embodiments, the manager device uses one or more intermediate supervisor devices to assist in managing the multiple NSDs.

Security policy templates can be defined by a user of the manager device and then used to implement consistent network security policies across multiple NSDs while reducing the risk of configuration error. Each template defines default network information filtering rules for various common services and protocols, and uses defined aliases to represent various specific devices of interest for a particular NSD. Security policy templates are discussed in greater detail below, as well as in the co-pending U.S. Patent Application entitled "GENERALIZED NETWORK SECURITY POLICY TEMPLATES FOR IMPLEMENTING SIMILAR NETWORK SECURITY POLICIES ACROSS MULTIPLE NETWORKS," filed May 6, 1999, incorporated herein by reference.

In order to remotely manage multiple NSDs, a manager device can use one or more intermediate supervisor devices. For example, after a security policy template is defined, the manager device can distribute the template to multiple NSDs by sending a single copy of the template to a supervisor device associated with the NSDs and by then having the supervisor device update each of the NSDs with a copy of the template. Each of the NSD template copies can then be configured with NSD-specific information from one or more of a variety of sources, such as by the manager device, by a local user such as a system administrator, or automatically such as with DNS information. In particular, aliases in the template copy on a particular NSD can be replaced with information about the specific corresponding devices that are protected by the NSD, and NSD-specific access information can also be specified. For example, an alias for an HTTP server can be replaced with the specific network address and name of the actual HTTP server.

Other information useful for implementing security policies for the NSDs, such as software components to be executed by the NSDs, lists of devices to be blocked (i.e., to block information flowing from and/or to the device), or updates to existing templates in use, can also be distributed by the manager device to the NSDs in a similar manner via the supervisor devices. Such information can also be configured with NSD-specific information if necessary in the manner described above. Those skilled in the art will appreciate that configuration of an NSD can occur not only when the NSD is initially installed, but also at later times. In addition to providing information to the NSDs, the manager device can also provide various types of information to the supervisor devices (e.g., software updates for software executing on the supervisor devices).

One or more intermediate supervisor devices can also assist the manager device in retrieving, analyzing and displaying the network security information gathered by the various NSDs. As each NSD executes and implements its specific security policy, the NSD gathers network security information about its activities and about the network information that is monitored. Each NSD forwards its network security information to a host supervisor device currently associated with the NSD so that the supervisor device can host the network security information by storing and/or processing it. If the supervisor device currently associated with an NSD becomes unavailable, the NSD instead forwards its network security information to one or more alternate host supervisor devices. In this manner, even if one supervisor device becomes unavailable, the network security information for the NSDs that were associated with the supervisor device is not lost. When the manager device wants to retrieve the network security information for an NSD, the manager device contacts the one or more supervisor devices which store portions of the network security information of interest, retrieves the various portions of the network security information, and then aggregates the retrieved information in an appropriate manner.

In some embodiments, the manager device and supervisor devices are external devices. Security for the communications between the manager device, supervisor devices, and NSDs can be provided in a variety of ways. For example, any of the information transmitted between the NSDs and the supervisor devices and between the supervisor devices and the manager device can be protected from unauthorized access by encrypting the information (e.g., using Data Encryption Standard (DES) in Cipher Block Chaining (CBC) mode). In addition, various schemes can be used to ensure that NSDs and supervisor devices provide information only to authorized devices or users, such as by using passwords, hashing passwords to produce keys, challenge/response, shared secrets, digital IDs, or a list of devices defined as being authorized to request and/or receive information. Part of the NSD-specific configuration of each NSD can include associating one or more supervisor devices authorized to communicate with the NSD, as well as providing specific information about how the communication is to occur. User authentication can be performed in a variety of ways, such as by using WINDOWS NT™ Domain Users and Groups RADIUS user authentication, or CRYPTOcard.

Referring now to FIG. 1, an embodiment of the Network Security Device Management (NSDM) system 100 includes a security policy manager device 110 able to communicate with multiple supervisor devices 120 and 160, also referred to as host devices or event processors. Each supervisor device is associated with multiple NSDs, with supervisor device 120 associated with NSDs 130 through 140 and with supervisor device 160 associated with NSDs 161 through 162. Each NSD protects one or more trusted devices from external devices, such as NSDs 130 and 140 protecting devices (not shown) in internal networks 135 and 145 respectively from devices (not shown) in external network 190. For the sake of brevity, supervisor device 160 and NSDs 161 through 162 are not described in detail.

In some embodiments, additional classes of devices which the NSD will protect are defined, with different security policies defined for each class of devices. For example, internal devices which are in direct communication with external devices (e.g., HTTP and FTP servers) may be specified in an optional class. Optional devices are typically afforded some level of trust greater than external devices but less than trusted devices, such as by monitoring some communications between optional and trusted devices. Thus, security policy templates and specific security policies can be viewed as defining levels of trust given to various specific devices or classes of devices.

Each NSD has a supervisor device which is designated as the primary supervisor device for that NSD. For example, supervisor device 120 is the primary supervisor for NSDs 130 through 140, and those NSDs store information about supervisor device 120 (e.g., the device's network address) with their respective specific security policy information 133 and 143 on storage devices 131 and 141. In a similar manner, supervisor device 160 is the primary supervisor for NSDs 161 through 162. NSDs 130 and 140 also store any required access information (e.g., one or more unique passwords which supervisor device 120 must provide in order to gain access to the NSDs) along with their respective device access information 134 and 144. The NSD-specific access information and primary supervisor device information can also optionally be stored by the manager device along with its supervisor device and NSD access information 115 and specific security policy information 116 respectively. Those skilled in the art will appreciate that storage devices 131 and 141 can be implemented in a variety of ways, such as by using local or remote storage, and by using a variety of storage media (e.g., magnetic disk, flash RAM, etc.).

The manager device has one or more input/output devices 118 (such as a display) to enable a user (not shown) to interact with the manager device. The manager device also stores a variety of information on storage device 111, including one or more NSD software updates 112, security policy templates 113, and aggregated network security information 114 from one or more NSDs. The manager device also optionally stores supervisor device and NSD access information 115 (e.g., passwords and a decryption key for stored information) as well as specific security policy information 116 (including NSD-specific configuration information) for one or more NSDs. Those skilled in the art will appreciate that storage device 111 can be implemented in a variety of ways, such as by using local or remote storage, and by using a variety of storage media (e.g., magnetic disk, flash RAM, etc.).

When a user of the manager device desires to establish or modify a security policy for one or more NSDs such as NSDs 130 and 140, the user first selects one of the security policy templates 113 or creates a new security policy template. Security policy templates are discussed in greater detail below with respect to FIG. 3. The manager device then determines the one or more primary supervisor devices for the NSDs of interest, such as by retrieving this information from its specific security policy information 116. If this information is not stored by the manager device, the manager device can obtain the information in a variety of ways, such as by querying the NSDs of interest or by querying the various known supervisor devices.

After the one or more primary supervisor devices are known, the manager device sends a single copy of the security policy template to each of the primary supervisor devices. For example, if the NSDs 130 and 140 are selected, a copy of the template is sent to supervisor device 120. The primary supervisor devices then send a copy of the security policy template to each of the selected NSDs. Each NSD stores its copy of the security policy template with the NSD's specific security information.

Each NSD's copy of the security policy template can then be configured with information specific to the NSD. For example, information about specific devices of interest from internal network 135 will be retrieved, and will be used to configure the security policy template for NSD 130. This NSD-specific information will be used to configure the security policy template into a specific security policy for the NSD, and the information will be stored with the specific security policy information for the NSD. The NSD-specific configuration can be conducted by a user via the manager device, by a local user such as a system administrator for the NSD, or automatically via a device-identifying service such as DNS.

When a user of the manager device desires to initially load or modify the software to be executed by one or more NSDs such as NSDs 130 and 140, the user first selects the software of interest, such as from NSD software updates information 112. The user can update some or all of the software components used by the NSDs. The manager device then distributes the software components to the NSDs in the same manner as for the security policy templates, including configuring the copies of the software with NSD-specific information if necessary. Each NSD stores the software, such as NSDs 130 and 140 storing their software with their security device software 132 and 142 respectively. The NSDs will implement the defined specific security policy by executing the software and using the stored specific security policy information. Those skilled in the art will appreciate that other types of information other than security policy templates and software can be distributed from the manager device to the NSDs in a similar manner.

As the NSDs execute their specific security policies, they gather various network security information of interest. Each NSD forwards its network security information to its primary supervisor device for storage. The network security information can be forwarded to the supervisor device in a variety of ways, such as immediately upon generation, on a periodic basis, or when the supervisor device requests the information. For example, NSDs 130 and 140 forward their network security information to supervisor device 120 for storage in the supervisor device's network security information log 125. If supervisor device 120 becomes unavailable, NSDs 130 and 140 will forward their network security information to another supervisor device, such as supervisor device 160. Supervisor device 160 stores the network security information it receives in network security information log 165. Thus, each supervisor device maintains one or more logs containing network security information sent by NSDs associated with the supervisor device.

When a user of the manager device desires to see the network security information of an NSD such as NSD 120, the manager device retrieves the network security information from each supervisor device which stores any of the network security information (e.g., any security information generated between two specified times, or all security information that is available). The manager device can determine these one or more supervisor devices in a variety of ways. For example, each of the supervisor devices can periodically inform the manager device of the NSDs which are currently associated with the supervisor device, and the manager device can store this information with its specific security policy information 116. The manager device can then aggregate the network security information that is retrieved from multiple supervisor devices in a variety of ways, such as chronologically, by event type, etc. This aggregated network security information can be stored by the manager device in the aggregated network security information 114 of the manager device, either individually or with the security information of other NSDs.

Those skilled in the art will appreciate that each device of the NSDM system may be composed of various components such as a CPU, memory, input/output devices (e.g., a display and a keyboard), and storage (e.g., a hard disk or non-volatile flash RAM). In addition, those skilled in the art will appreciate that the described embodiment of the NSDM system is merely illustrative and is not intended to limit the scope of the present invention. The system may contain additional components or may lack some illustrated components. In particular, there may be multiple manager devices and/or multiple hierarchical layers of supervisor devices such that some supervisor devices supervise other supervisor devices. Alternately, the manager device and one or more supervisor devices may be implemented as a single computer system such that the manager device communicates directly with NSDs. Also, in some embodiments the devices which host network security information for the NSDs can be separate devices from those which supervise and send management information to the NSDs. Accordingly, the present invention may be practiced with other configurations.

Figure 2:
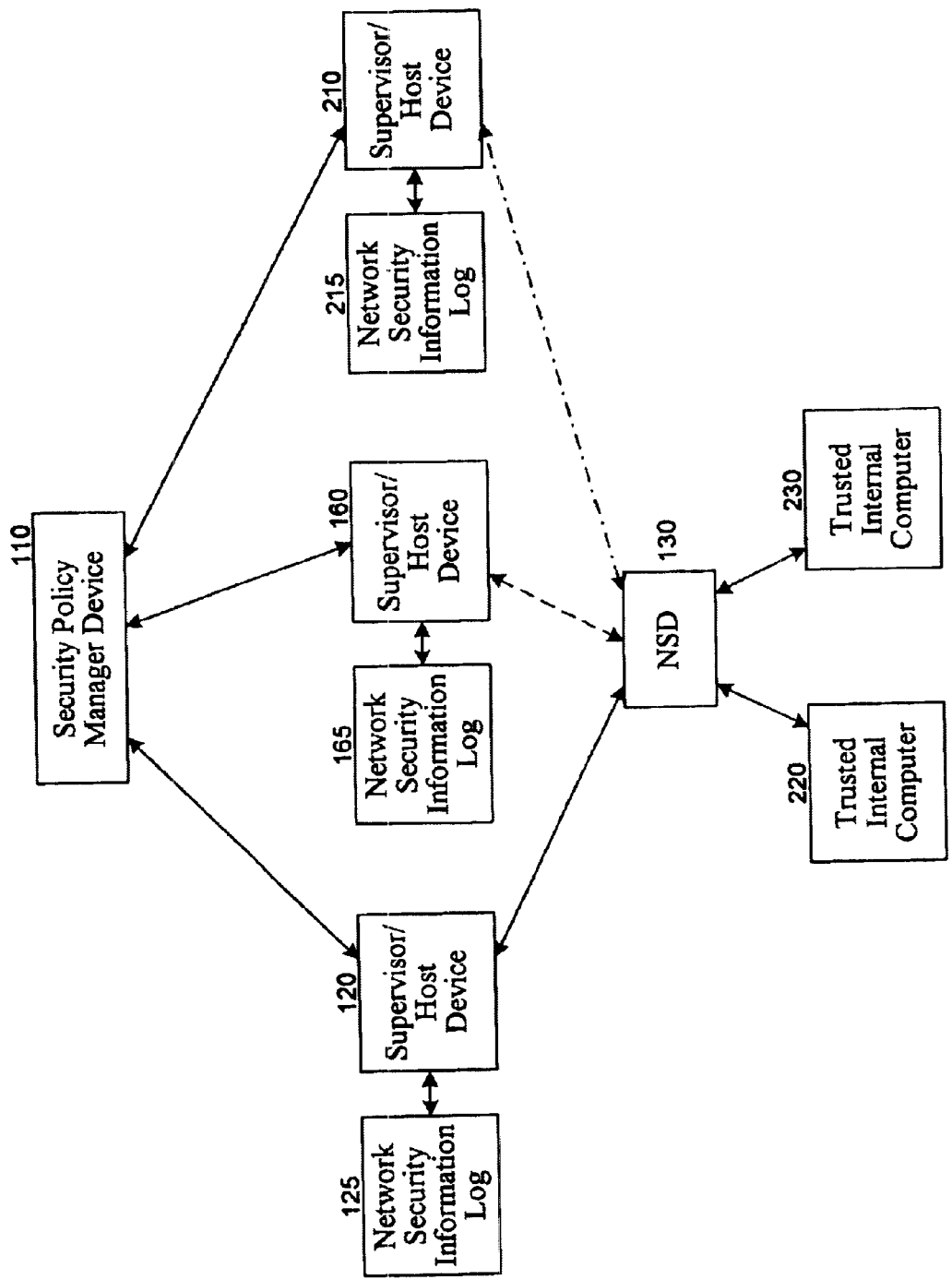
FIG. 2 is a block diagram illustrating the flow of network security information from a network security device (NSD) to the manager device.

Referring now to FIG. 2, an embodiment of the NSDM system is used to illustrate how network security information from an NSD is stored by multiple supervisor devices. In some embodiments, each NSD has not only a primary supervisor device which is associated with the NSD, but also one or more additional associated supervisor devices (e.g., secondary and tertiary devices, or multiple secondary devices). As with the primary supervisor device, these additional supervisor devices for an NSD can be specified in a variety of ways, such as by a user of the manager device during configuration of the NSD or automatically based on a variety of criteria (e.g., geographic proximity to the NSD, capacity of the supervisor device, etc.). Each NSD can store information about the additional supervisor devices with their specific security policy information, as well as any required access information for the additional supervisor devices along with their device access information.

As is discussed above with respect to FIG. 1, supervisor device 120 has been designated as the primary supervisor device for NSD 130. As is illustrated in FIG. 2, two other supervisor devices have also been associated with NSD 130. In particular, supervisor device 160 has been designated as a secondary supervisor device for NSD 130, and supervisor device 210 has been designated as a tertiary supervisor device. Tho se skilled in the art will appreciate that any number of supervisor devices could be associated with any given NSD, and that different NSDs can have different groups of associated supervisor devices. Supervisor devices 160 and 210 maintain network security information logs 165 and 215 respectively, and supervisor devices 120, 160 and 210 are all able to communicate with security policy manager device 110.

As is illustrated, NSD 130 protects multiple trusted devices 220 through 230 in internal network 135 from external devices in external network 190 (not shown). As NSD 130 implements its specific security policy and notes events of interest, it gathers various network security information related to the events. When NSD 130 has network security information that is to be transmitted to a supervisor device for storage, NSD 130 first determines if primary supervisor device 120 is available to host the information (e.g., by sending a status query message to the device). If primary supervisor device 120 is able to receive network security information from NSD 130 and has the capacity to store the information, NSD 130 sends the network security information to supervisor device 120 for storage in the network security information log 125.

If, however, primary supervisor device 120 is not available to host the network security information from NSD 130, the NSD determines an alternate host supervisor device (referred to as a "fail-over"). Since supervisor device 160 has been designated as the only secondary supervisor device, NSD 130 determines if that supervisor device is available to host the network security information. If so, supervisor device 160 becomes the supervisor device currently associated with NSD 130, and the NSD forwards the information to the supervisor device. If supervisor device 160 is not available, the NSD determines a next supervisor device (e.g., supervisor device 210) to check for availability. In this manner, the network security information for a single NSD may be stored across multiple host supervisor devices. As discussed above, the manager device can be informed as to the NSDs currently associated with each supervisor device in a variety of ways, such as by the supervisor devices or the NSDs periodically sending status messages to the manager device.

The details of how the fail-over process works can be implemented in a variety of ways. For example, in some embodiments after NSD 130 has switched its current association to an alternate supervisor device such as supervisor device 160, NSD 130 will continue to use that supervisor device as its host device until that supervisor device becomes unavailable. Alternately, the NSD could instead continue to try to send network security information to its primary supervisor device even if the current supervisor device remains available, such as by periodically checking the availability of the primary supervisor device or by first attempting to send each portion of network security information to the primary supervisor device. In addition, if an alternate supervisor device such as supervisor device 160 becomes unavailable, NSD 130 could first check the primary supervisor device for availability before checking other alternate supervisor devices, or could instead check the next supervisor device (supervisor device 210) that is associated with the NSD.

Those skilled in the art will also appreciate that fail-over among multiple supervisor devices can occur in a variety of ways. For example, additional supervisor devices can be associated with an NSD only when needed, such as when the primary supervisor device becomes unavailable. In addition, the NSDs may use a currently associated host supervisor device for reasons other than storing network security information, such as for forwarding messages to the manager device or to other NSDs.

Figure 3A:
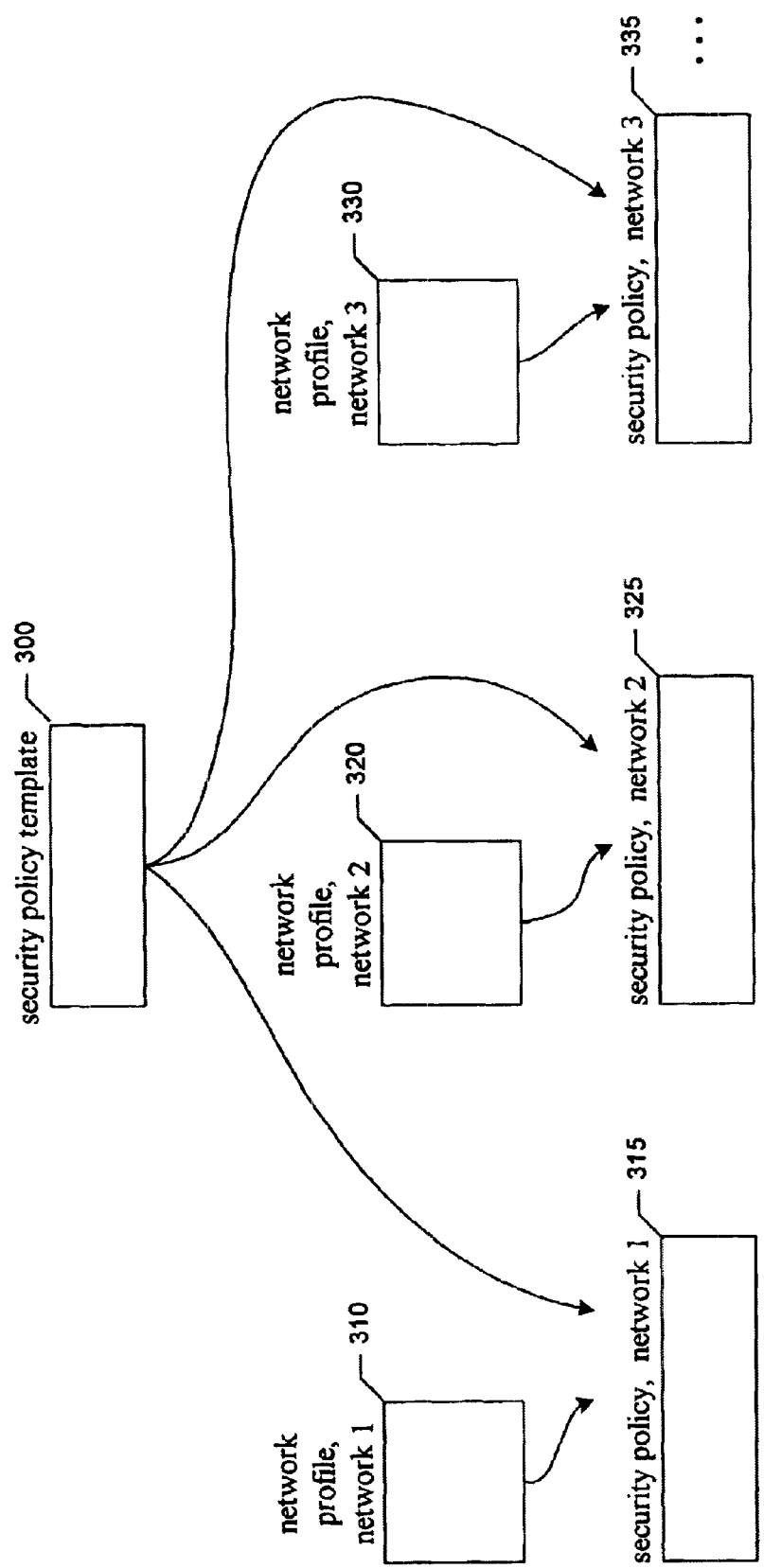
FIGS. 3A–3H are examples of security policy templates.

FIGS. 3A–3H are examples of security policy templates. FIG. 3A is a conceptual diagram illustrating the generation from a single security policy template of specific security policies for each of several NSDs and their respective internal networks. A security template 300 is first generated, such as by a user of the manager device. Then, for each of a number of different networks 315, 325, 335, etc., the user generates a network profile containing NSD-specific information for implementation by the NSD protecting that network. These network profiles are shown as network profiles 310, 320, 330, etc. In order to generate the specific security policy for each network, the security policy template is combined with the network profile for that network. For example, in order to create security policy 315 for network 1, the security policy template 300 is combined with network profile 310 for network 1.

Figure 3B:
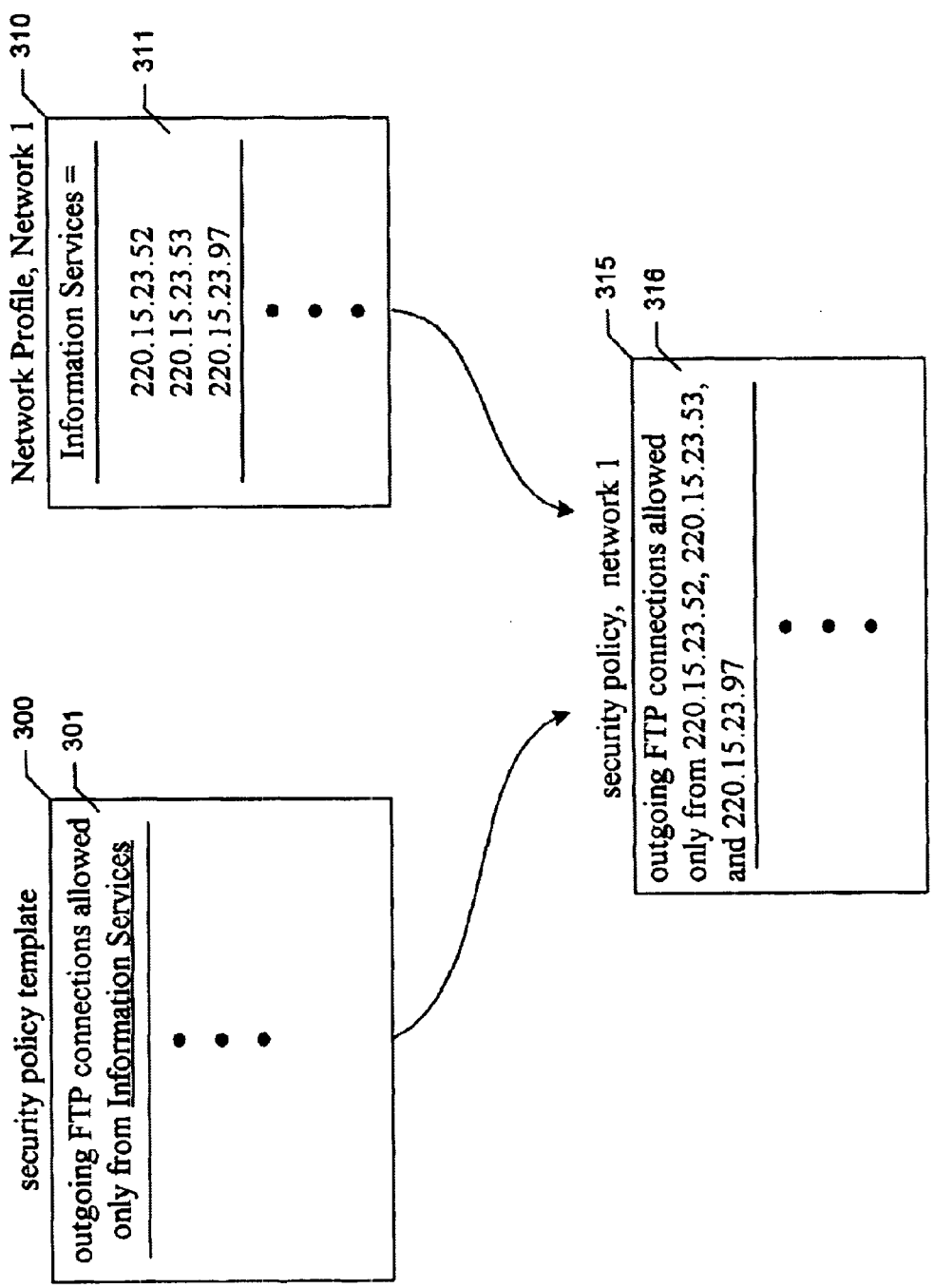

FIG. 3B is a conceptual diagram illustrating the creation of a security policy in greater detail. In particular, FIG. 3B shows the creation of security policy 315 for network 1 shown in FIG. 3A. FIG. 3B shows that the security policy template 300 contains a number of security policy filter rules, including security policy rule 301. Security policy rule 301 specifies that outgoing FTP connections are allowed only from network elements defined as being within the "InformationServices" alias. While only one security policy rule is shown in security policy template 300 to simplify this example, security policy templates often have a larger number of such security policy rules.

The network profile 310 for network 1 contains a definition of the "InformationServices" alias 311. It can be seen that this definition defines the "InformationServices" alias to include the network elements at the following IP addresses:

220.15.23.52

220.15.23.53

220.15.23.97

In general, a network profile contains an alias definition like alias definition 311 for each alias used in the security policy template.

When the security policy template 300 and the network profile 310 for network 1 are combined to create the security policy 315 for network 1, the facility replaces the "InformationServices" alias in rule 301 with the network addresses listed for the "InformationServices" alias in definition 311. Doing so produces rule 316 in the security to policy 315 for network 1, which indicates that outgoing FTP connections are allowed only from the network elements having IP addresses 220.15.23.52, 220.15.23.53, and 220.15.23.97. In the same manner, for each additional rule in security policy template 300, each occurrence of an alias is replaced with the network addresses of the network elements defined to be within the alias in the network profile 310 for network 1. As a result, the rules in security policy 315 for network 1, which are to be implemented in network 1, specifically refer to network elements within network 1. In this sense, they differ from the rules in security policies 325 and 335, which specifically refer to network elements within networks 2 and 3, respectively.

Figure 3C:
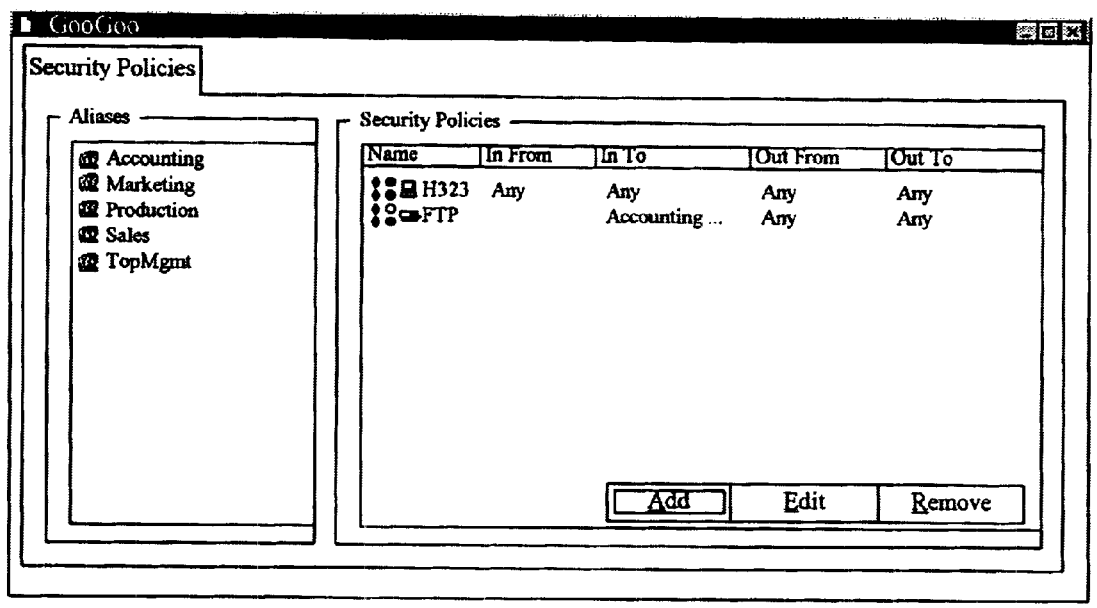
Figure 3D:
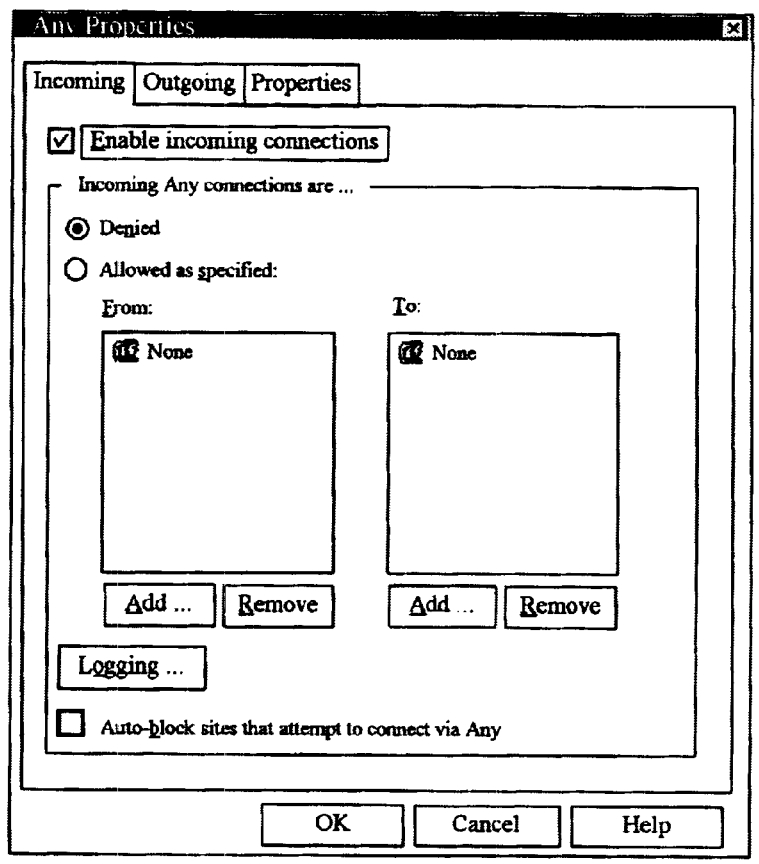
Figure 3E:
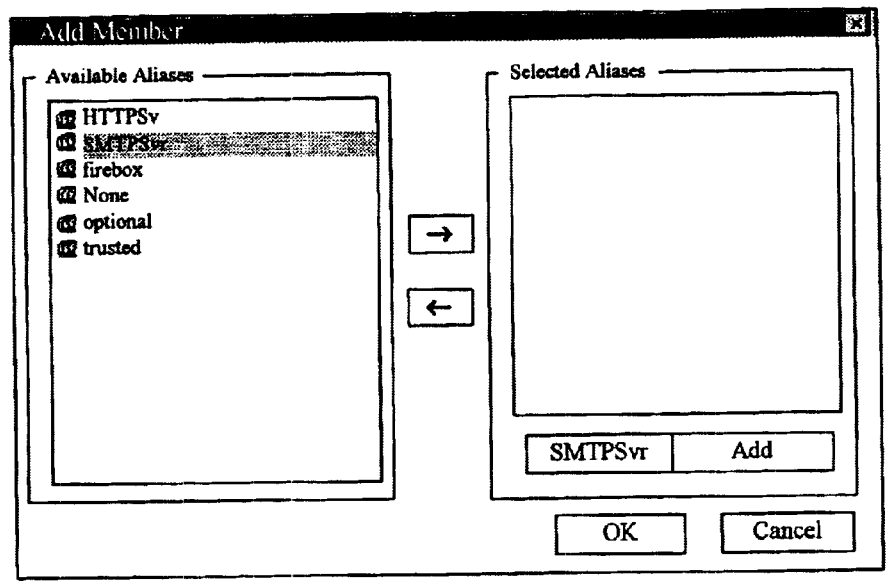

FIGS. 3C–3H provide exemplary graphical user interface screens such as may be provided by a manager device to assist in defining security policy templates. Referring now to FIG. 3C, a variety of aliases are available to be used in creating security policy templates. Note that aliases may be related to services and protocols (e.g., H323 and FTP) as well as to conceptual identifications of one or more network devices such as may be based on a particular NSD customer's network (e.g., Accounting, Marketing, Production, Sales, and TopMgmt). As is illustrated, filter rules have been defined for the H323 and FTP aliases. Referring now to FIG. 3D, a specific filter rule such as for a particular service is illustrated in detail, allowing control for incoming and outgoing packets based on specific senders and recipients. Each filter rule can include associated information as to whether to generate network security information when the rule applies (e.g., via the Logging button). Referring now to FIG. 3E, an interface for defining aliases is shown along with a list of various defined exemplary aliases.

Figure 3F:
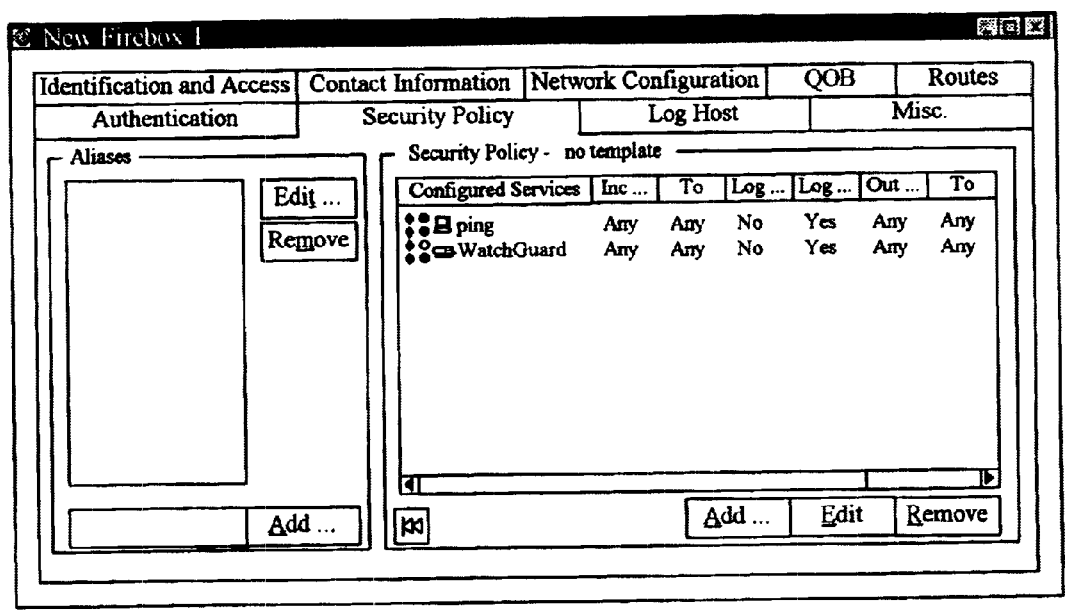

Referring now to FIG. 3F, an example of a user interface for configuring a security policy template for a specific NSD of a particular customer is shown. In particular, a filter rule for the available service ping is shown. In the illustrated embodiment, a WatchGuard service has also been defined to manage communications between the NSD and supervisor devices. Configuring the NSD can include specifying Contact Information for the customer (e.g., company name, contact person, customer ID, etc.), Identification and Access information (e.g., the NSD name and serial number, the NSD external IP address, a modem number that is used by the NSD, etc.), Network Configuration information (e.g., IP addresses for the default gateway and for the trusted, external and optional interfaces, as well as hosts and networks related to each of the interfaces), Out Of Band (OOB) information to specify how to communicate with the NSD in ways other than through the external network (e.g., via a modem or serial port), Route information (e.g., network routing information when the customer uses a router to connect one or more secondary networks to a network behind the NSD), Authentication information to specify how user and/or device authentication will be performed, Log Host information about the one or more supervisor devices associated with the NSD (e.g., a list of supervisor devices in order of precedence, with the primary supervisor device first, as well as password and other access information needed to interact with the devices), and Miscellaneous information such as the current time zone.

Figure 3G:
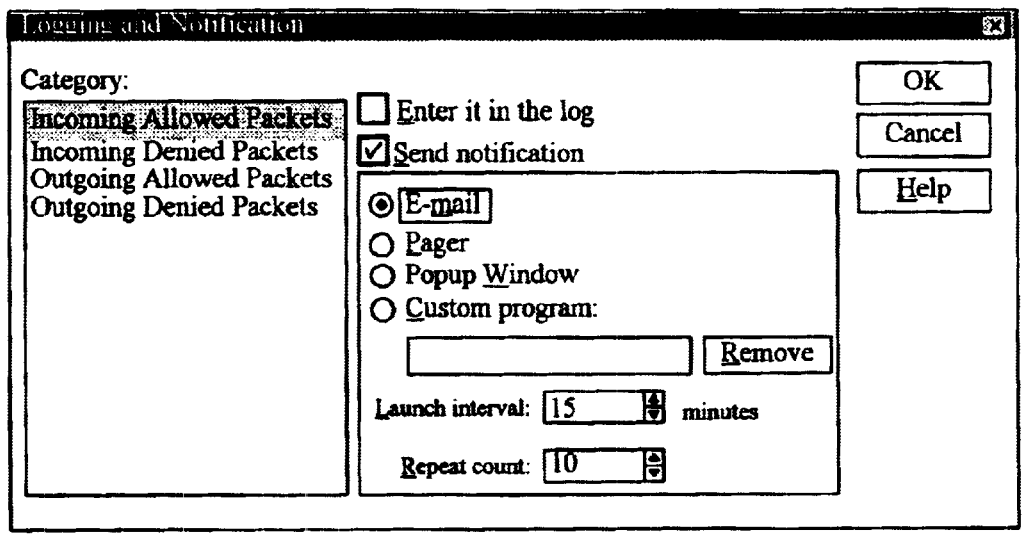
Figure 3H:
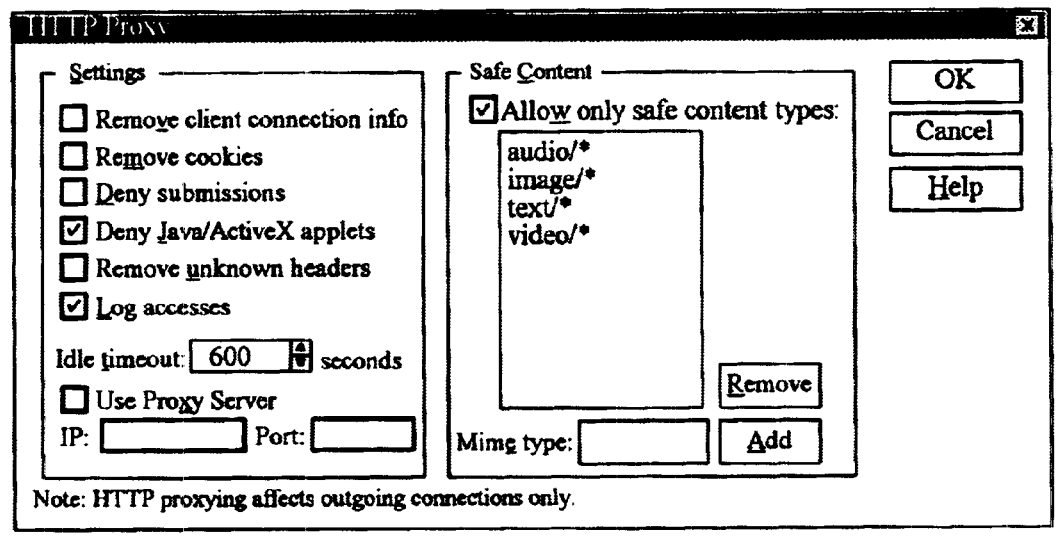

FIGS. 3G and 3H provide exemplary information related to events of interest and the specifying of network security information of interest. Referring first to FIG. 3H, various configuration information for an HTTP proxy service is shown, including types of information which may be denied passage (e.g., submissions, JAVA™ or ACTIVEX™ applets, and various types of information such as audio, images, text, and video) as well as whether to log network security information about accesses of the service. Referring now to FIG. 3G, a GUI is shown for specifying how to generate network security information, such as for a filter rule or service, and how to notify indicated users or devices of the network security information.

Those skilled in the art will appreciate that this information is provided for exemplary purposes only, and that the invention is not limited to the specific details discussed.

FIGS. 4A–4H provide an example of various network security information and NSD status information generated by implementing a specific security policy. Those skilled in the art will appreciate that network security information can include a variety of types of information about packets of interest, such as the direction, network interface, total length, protocol, header length, time to live, source IP address, destination IP address, source port, destination port, ICMP type and code, information about IP fragmentation, TCP flag bits, and IP options. The network security information can also include information about the logging itself, such as a time stamp, the action taken after applying filter rules, and information about the supervisor/host device such as the device name, corresponding process name, and corresponding process ID.

Those skilled in the art will also appreciate that this information is provided for exemplary purposes only, and that the invention is not limited to the specific details discussed.

FIGS. 5A–5D provide examples of a GUI displaying to a user of a manager device a hierarchical view of multiple supervisor devices and NSDs as well as corresponding configuration and network information.

Figure 5A:
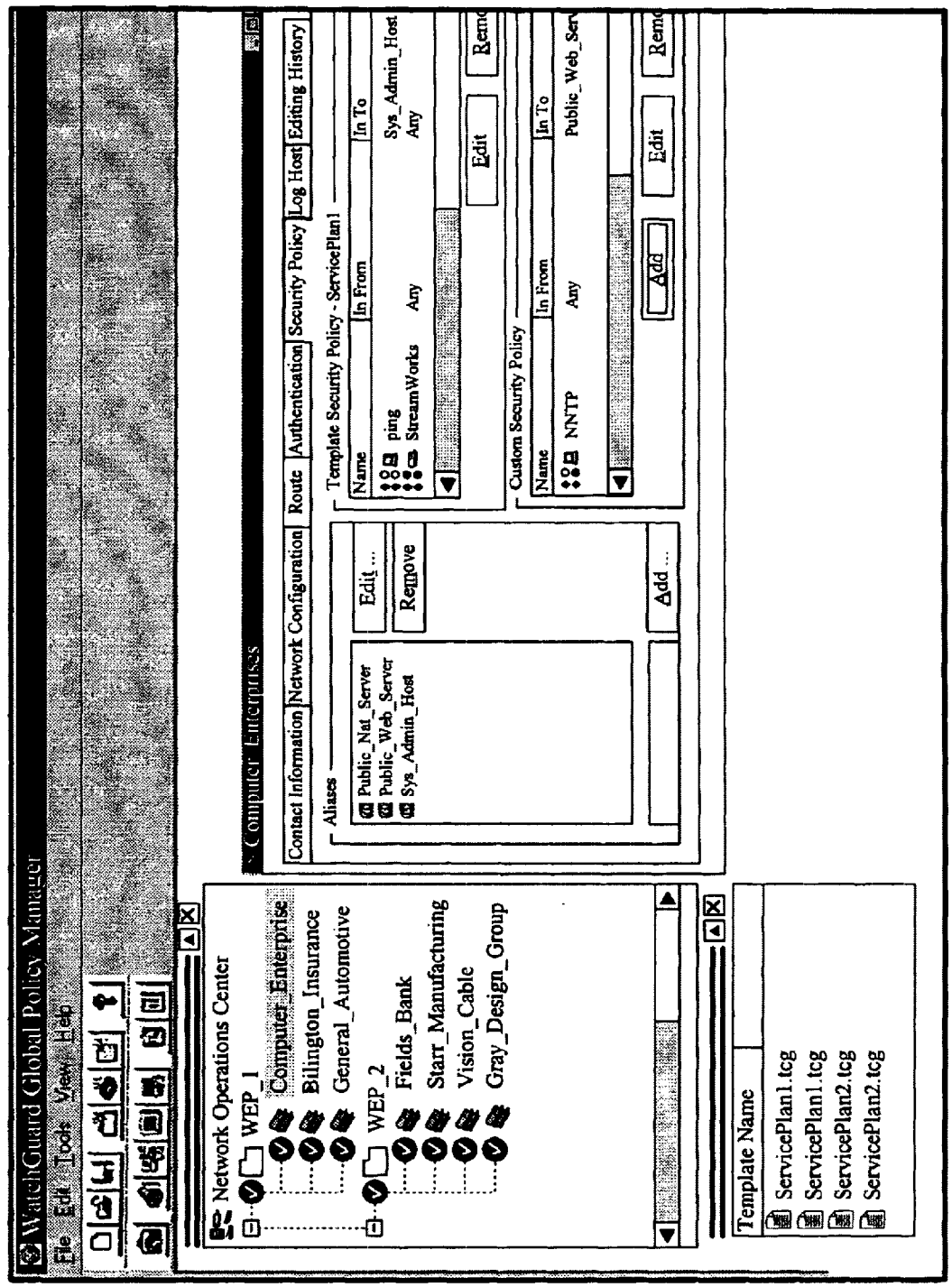
FIGS. 5A–5D are examples of a manager device's hierarchical view of multiple supervisor devices and NSDs and of corresponding configuration and network information.

Referring now to FIG. 5A, a manager device ("Network Operations Center"), two supervisor devices ("WEP_1" and "WEP_2"), and seven NSDs ("Computer_Enterprises," "Bilington_Insurance," "General_Automotive," "Fields_Bank," "Starr_Manufacturing," "Vision_Cable," and "Gray_Design_Group") are illustrated in the upper left pane of the GUI. The first three NSDs are currently associated with the WEP_1 supervisor device, and the next four NSDs are currently associated with the WEP_2 supervisor device. The hierarchical arrangement allows devices to be accessed in a variety of ways, such as by selecting all of the security devices associated with a supervisor device by merely selecting or indicating the supervisor device. Note that supervisor devices and their associated security devices can be organized in a variety of ways, such as by geographical proximity or by conceptual similarity (e.g., grouping customers based on similar types of business).

As is illustrated by the icons shown beside the devices in the left pane, a variety of information about the devices can be displayed graphically (e.g., type of device and connection status). In addition, as is shown in the right pane of the GUI, various information about the supervisor devices and NSDs can be displayed textually (e.g., the IP address, connection status, and phone number). The current contents of the right pane indicate that a variety of specific information can be displayed for a particular security device (in this example, "Computer Enterprises"). Similarly, other information accessible to the device executing the GUI can be displayed, such as the available security policy templates shown in the lower left pane.

In addition to the currently displayed information, other tools and information can also be accessed via the GUI (e.g., via the top-level menus, pop-up menus for particular displayed items, via the toolbar, etc.). For example, other available tools include the Security Management System (SMS) tool provides a GUI for viewing and modifying the existing security policy, as well as access to higher-level functions such as adjusting proxy settings, customizing web surfing rules and configuring a VPN. The SMS tool allows a user to specify access information for an NSD, examine or edit the configuration information of an NSD, save NSD configuration information either locally or on an NSD, add and delete services for the NSD, specify network-specific addresses for the NSD, set up logging and notification details about network security information, define default packet handling rules, block network information passing to or from certain IP addresses and port numbers, set up IP masquerading so that the NSD presents its IP address to the external network in lieu of any specific internal network addresses, set up port forwarding so that the NSD redirects incoming packets to a specific masqueraded device in the internal network based on the destination port numbers of the packets, determine the level of security for incoming and outgoing sessions using proxy services, and organize the internal network by defining aliases, defining groups of internal devices, and defining groups of users (e.g., with different levels of access privileges).

Other tools also include the Status Viewer for retrieving specific status information about an NSD (e.g., version information, uptime, memory usage, active connections, etc.), the Log Viewer for displaying network security information, the Host Watch for providing a graphical view of real-time connections between an NSD's trusted and external networks, the Service Watch for graphing the number of connections of service, the Mazameter for displaying real-time bandwidth usage for a particular NSD interface, and the Historical Reporting to run NSD reports related to exceptions (such as denied packets), usage by supervisor device, service, or session, time series reports, masquerading information reports, and URL reports.

Figure 5B:
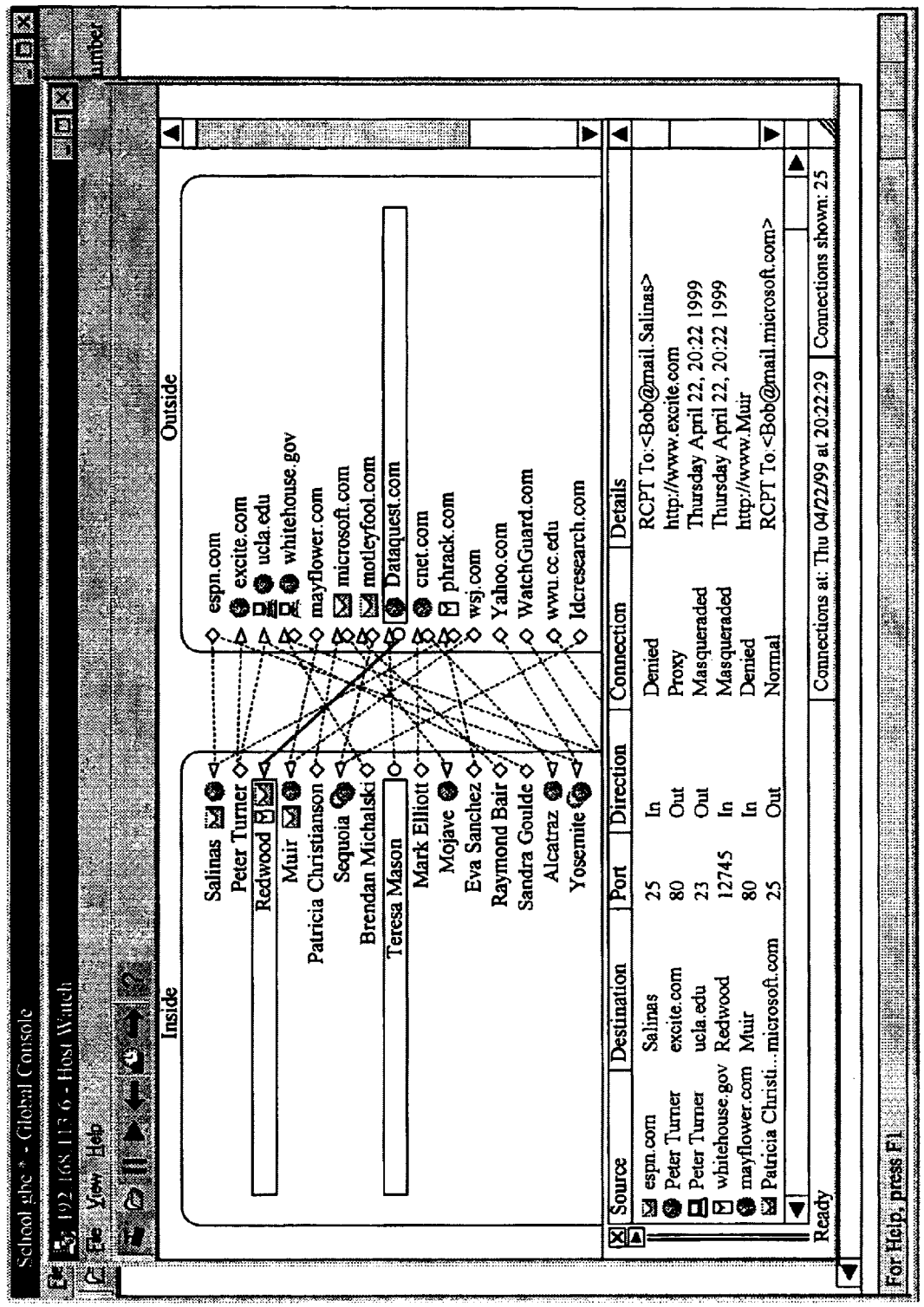
Figure 5C:
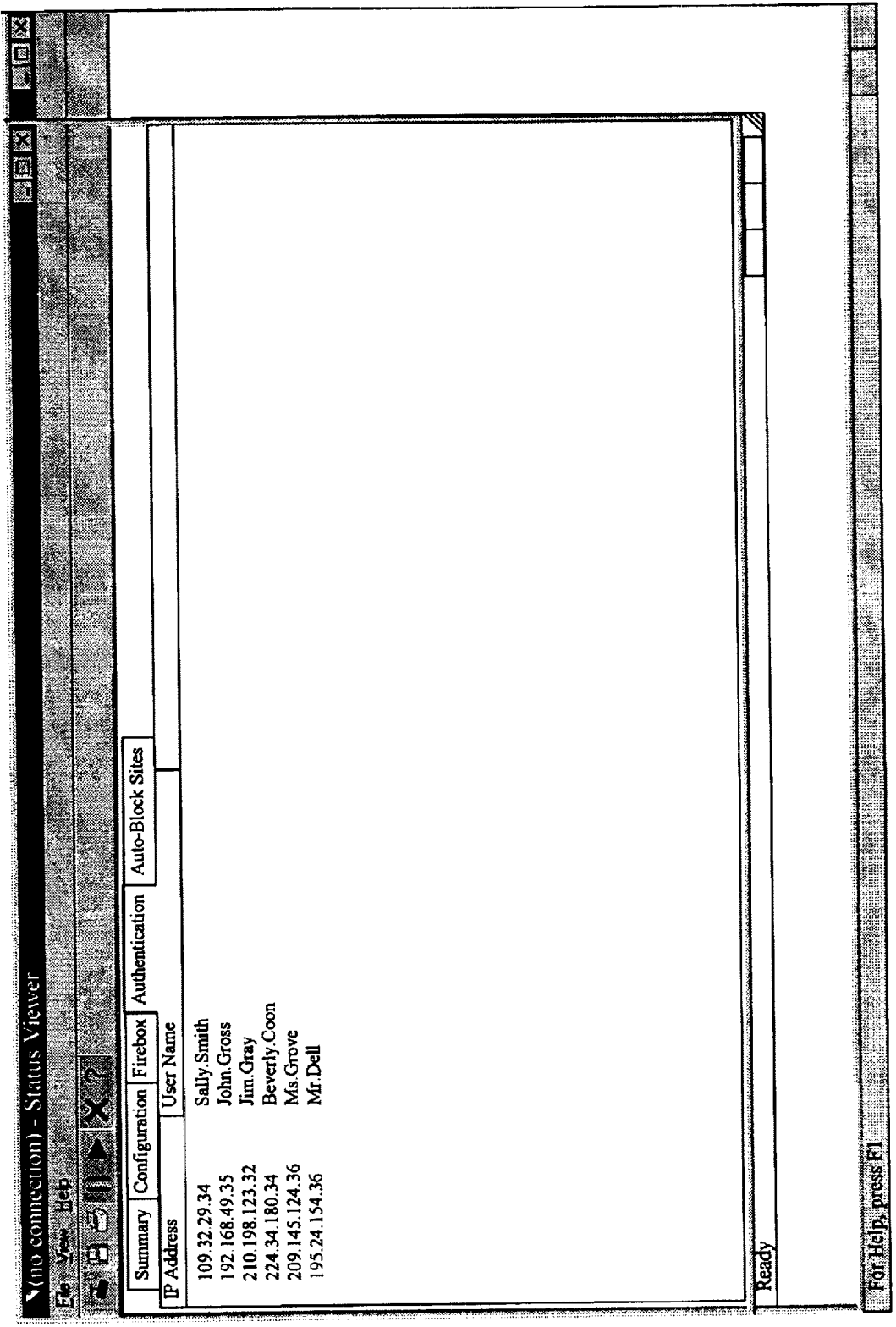
Figure 5D:
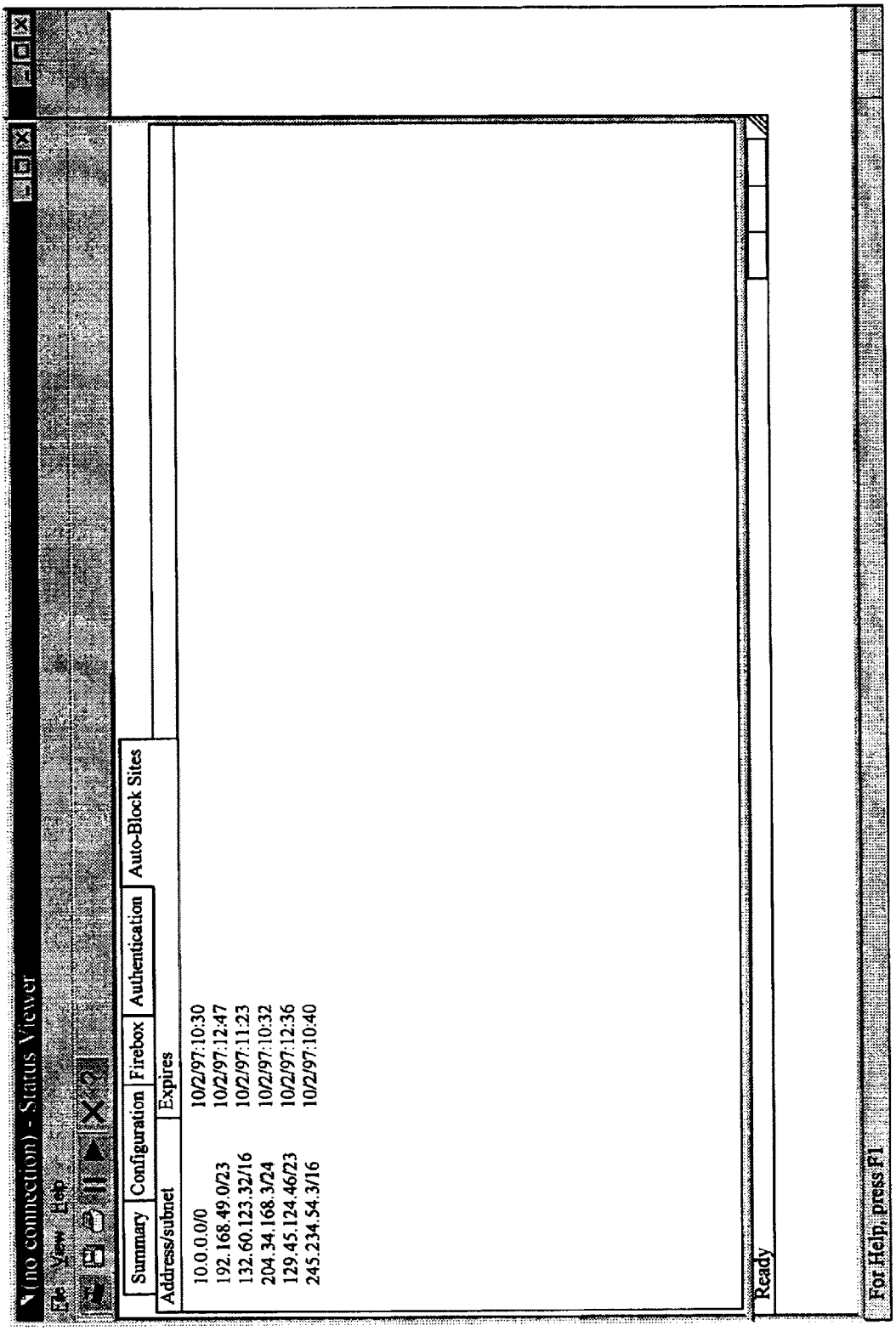

FIG. 5B provides an example of a GUI for a Host Watch tool that provides a graphical view of real-time connections, and FIGS. 5C and 5D provide examples of GUIs for a Status Viewer tool. FIG. 5C indicates various users associated with specific IP addresses, and FIG. 5D includes information about IP addresses and ports which are currently blocked.

Those skilled in the art will also appreciate that this information is provided for exemplary purposes only, and that the invention is not limited to the specific details discussed.

Figure 6:
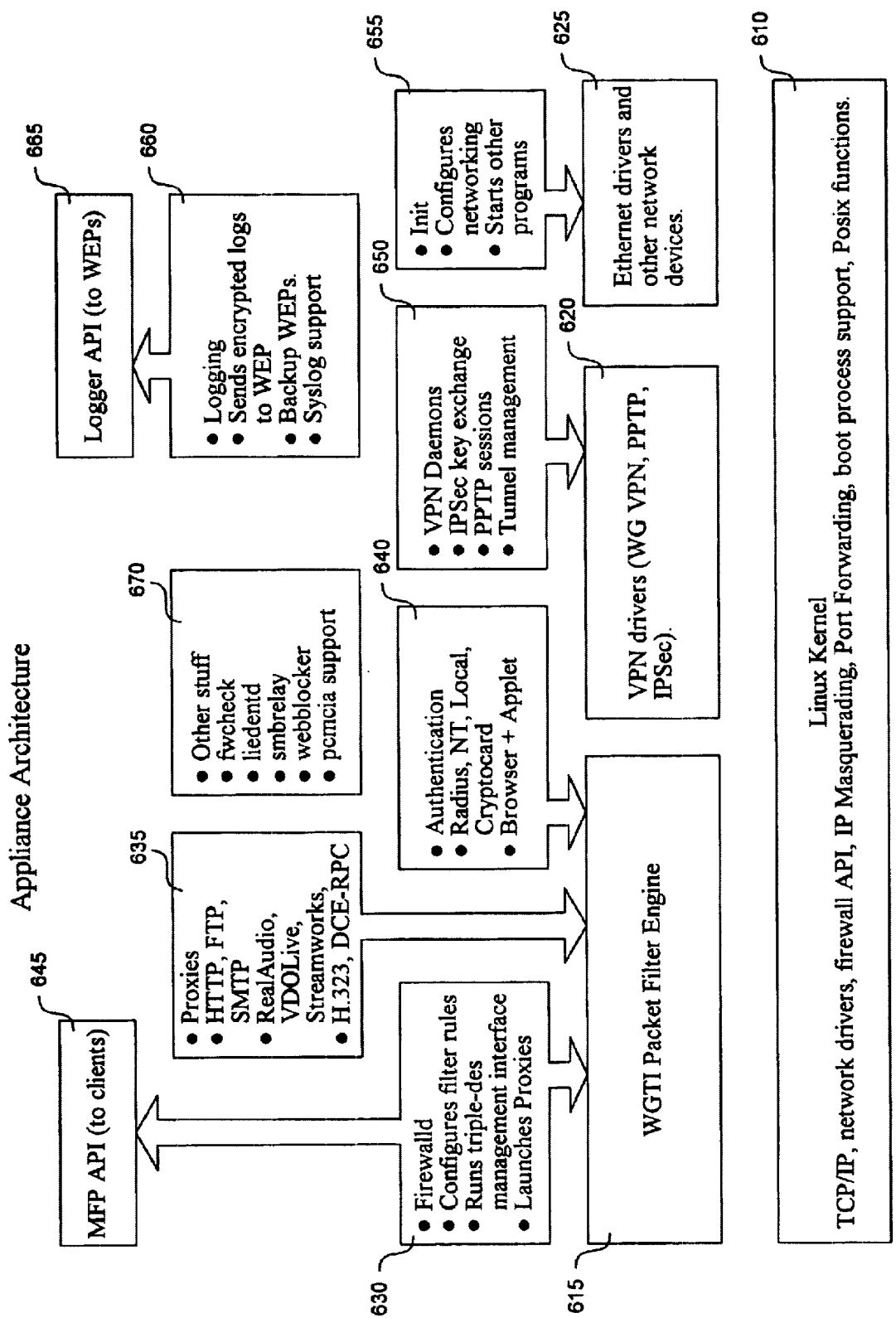
FIG. 6 is an example of one or more NSD software components which can be distributed by a manager device.

FIG. 6 is an example of one or more NSD software components which can be distributed by a manager device to an NSD. In the illustrated embodiment, the NSD is a security appliance device capable of executing the Linux operating system. In addition to implementing a specific security policy that generates network security information, the NSD can also perform additional tasks, such as providing support for Virtual Private Networks (VPNs). The NSD software components include a version of the Linux OS kernel 610 which is capable of executing on the NSD to provide various OS functionality (e.g., TCP/IP support, network drivers, etc.). The OS software component can also include an application programming interface (API) so that various other software components can interact with the OS kernel in a consistent manner.

One software component which interacts directly with the OS is the packet filter engine 615. The packet filter engine implements the specific security policy for the NSD, and interacts with various other software components including the firewall 630, proxies for various network services 635, and authentication software 640. The firewall component can provide a variety of functions such as configuring security policy filter rules, providing an interface to implement communication and access security (e.g., via encryption), launching proxies for various network services, and communicating with management software of the NSD client (e.g., a business which owns the trusted devices protected by the NSD). The firewall component can provide a client API 645 which client computers can contact, or can instead communicate with such an API provided by the client. The various network service proxies can provide a variety of information about the activities and configuration of the proxies, and the authentication software can ensure that users or devices provide the necessary access information before gaining access to the NSD or being able to receive information (e.g., network security information) from the NSD.

Other software components which interact directly with the OS include various functionality-specific drivers (e.g., VPN drivers) 620, and various service and protocol drivers (e.g., TCP/IP driver) 625. Most functionality-specific drivers will also have a corresponding software component which implements the functionality and which interacts with the driver, such as the VPN software 650 interacting with driver 620. Similarly, one or more software components may be associated with the service and protocol drivers to implement or provide support for those protocols and services, such as the initialization program 655 interacting with drivers 625.

It is also possible for some software components to execute on the NSD in a manner such that they do not directly interact with other software components. For example, the network security information logging component 660 provides network security information to supervisor devices. While the logging component could interact with other components such as the packet filter engine to retrieve the network security information of interest, the logging component could also retrieve the information from a temporary local storage without such direct interaction. The logging component can provide a supervisor device API 670 which supervisor devices can contact, or can instead communicate with such an API provided by the supervisor devices. As with the firewall component and other components providing information or access to external devices, the logging component can provide for the security of the information it provides in a variety of ways (e.g., encrypting the information before transmitting it).

Finally, as illustrated by the software components 670, a variety of other optional software components can be provided to and executed by an NSD. These components may or may not interact with other displayed software components. Those skilled in the art will appreciate that various of the displayed software components may interact with each other even if such interaction is not graphically illustrated, that existing software components could be removed, and that various software components could alternately be grouped together into a single component or separated into separate subcomponents. In addition, those skilled in the art will appreciate that various specific types of software (e.g., the Linux OS and the TCP/IP protocol) could be replaced with alternate types of software providing similar functionality.

Those skilled in the art will also appreciate that this information is provided for exemplary purposes only, and that the invention is not limited to the specific details discussed.

Figure 7:
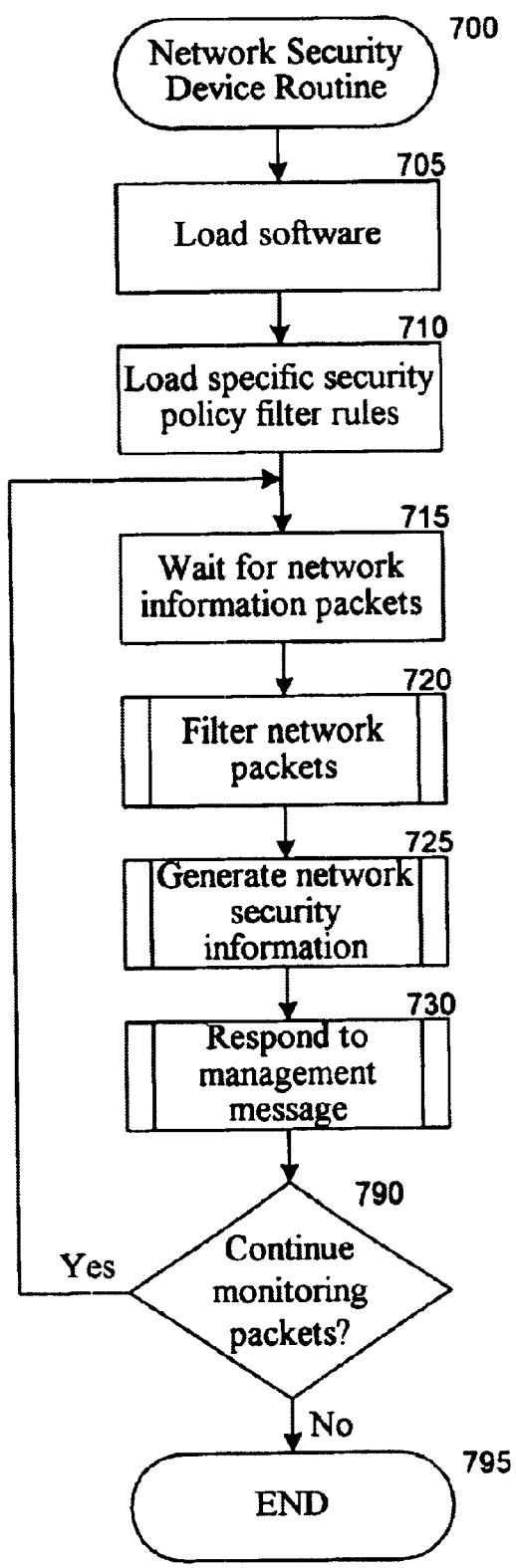
FIG. 7 is an exemplary flow diagram of an embodiment of the Network Security Device routine.

FIG. 7 is an exemplary flow diagram of an embodiment of the Network Security Device routine 700. The routine implements a specific security policy for an NSD by monitoring network information passing between devices of interest (e.g., between external devices and trusted devices), applying security policy filter rules when appropriate, and generating network security information about events of interest. In addition, the routine responds to management-related messages (e.g., from supervisor devices) when appropriate.

The routine begins at step 705 where the NSD executes an initial boot program that loads the software to be executed by the NSD. After the software is loaded, the routine continues to step 710 to load various NSD-specific network packet filter rules that will be used to implement the specific security policy for the NSD, as well as any other NSD-specific configuration information. The software and NSD-specific configuration information will typically be stored in non-volatile memory (e.g., flash RAM or a magnetic disk) by the NSD, but can also be loaded from a remote device.

After step 710, the routine continues to step 715 to monitor any passing network information. When network information packets of interest are detected, the routine continues to step 720 to filter the network information packets by executing the Filter Network Packets subroutine 720. After filtering the network information packets, the routine continues to step 725 to generate network security information about any events of interest by executing the Generate Network Security Information subroutine 725. The routine then continues to step 730 to respond to any management-related messages received (e.g., from a supervisor device) by executing the Respond To Management Message subroutine 730. After step 730, the routine continues to step 790 to determine whether to continue monitoring network information packets. If so, the routine returns to step 715, and if not the routine ends at step 795.

Those skilled in the art will appreciate that network information can be monitored and altered in a variety of ways. In addition, network information can be specified in a variety of different types of packets, and can take a variety of forms other than packets. In addition, an NSD can be implemented in a variety of ways, such as by using a general-purpose computer executing specialized software or by using a special-purpose computer. For example, the Firebox10 and Firebox100 products from WatchGuard Technologies, Inc., of Seattle, Wash., can be used to implement some aspects of an NSD.

Figure 8:
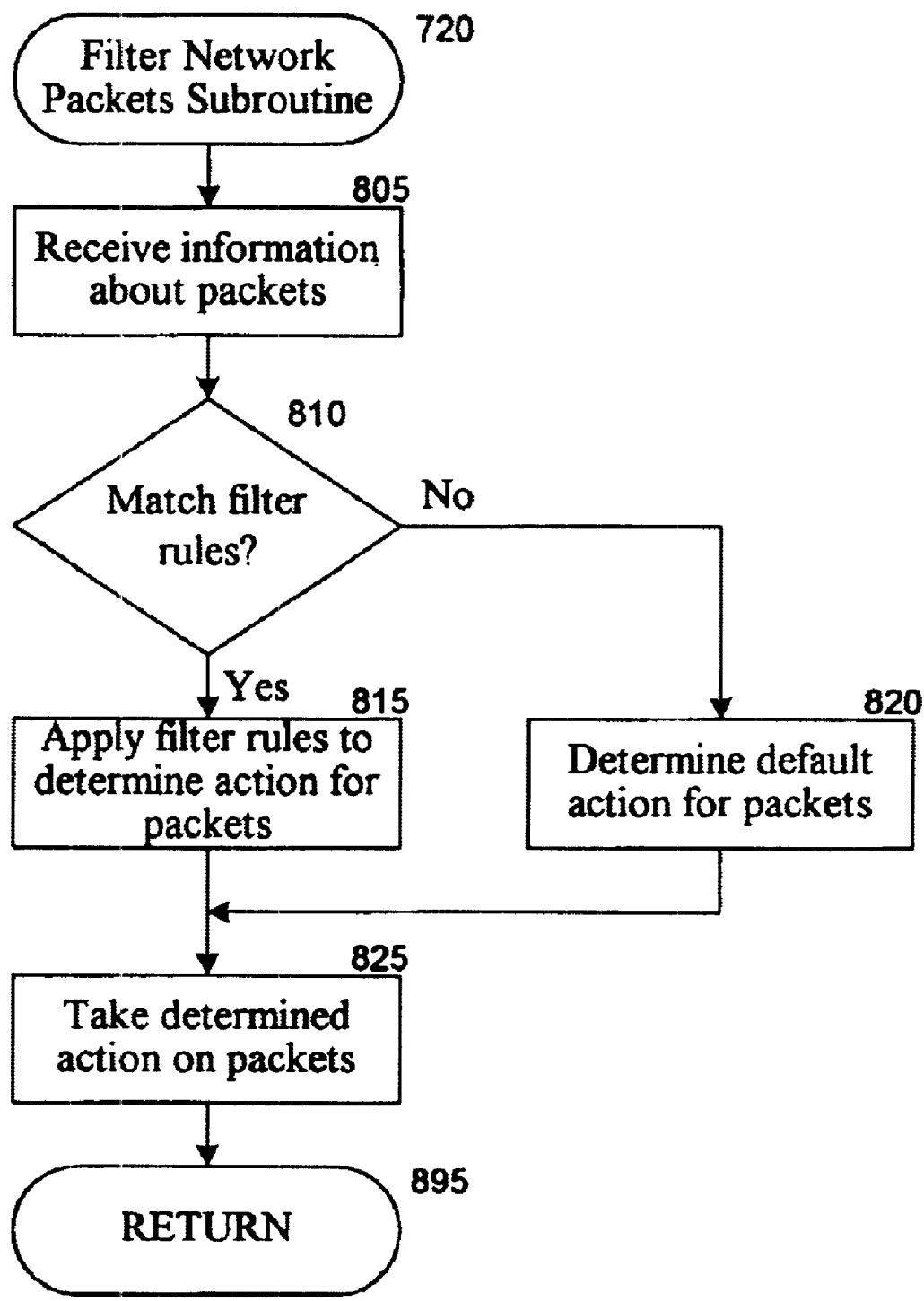
FIG. 8 is an exemplary flow diagram of an embodiment of the Filter Network Packets subroutine.

FIG. 8 is an exemplary flow diagram of an embodiment of the Filter Network Packets subroutine 720. The subroutine determines whether network information packets match one or more security policy filter rules, applies filter rules as appropriate to determine what actions to take for the packets, and then takes the appropriate action. The subroutine begins at step 805 where information about the network information packets of interest are received. The subroutine continues to step 810 to determine if the packets match one or more of the filter rules. If so, the subroutine continues to step 815 to apply one or more of the filter rules as appropriate to determine an action to be taken for the packets. For example, if multiple rules apply then only the rule with the highest precedence may be used, or alternately each matching rule may be applied in order of increasing or decreasing precedence.

If it is instead determined in step 810 that none of the filter rules apply, the subroutine continues to step 820 to determine a default action to be taken for the packets. A variety of types of default actions can be used, including denying passage of all packets that are not explicitly approved, blocking spoofing attacks, blocking port space probes, and blocking address space probes. After steps 815 or 820, the subroutine continues to step 825 to take the determined action on the packets. In the illustrated embodiments, the possible actions include denying or allowing the passage of the packet to the intended recipient. After step 825, the subroutine continues to step 895 and returns.

Those skilled in the art will appreciate that a network information security policy can be implemented in ways other than using filter rules. In addition, default filtering rules can be used such that some filter rules will apply to any packet. Moreover, a variety of actions can be taken on packets other than allowing or denying passage of the packets, including modifying the packets to add or remove information, or holding the packets until additional processing (e.g., manual review) can be performed on the packets. In addition, additional actions may be necessary for the subroutine based on the format of the packets. For example, determining whether a packet matches a filter rule may require first stripping various network transmission information from the packet, and this information may need to be added back to the packet if the determined action for the packet is to allow its passage to its intended recipient.

Figure 9:
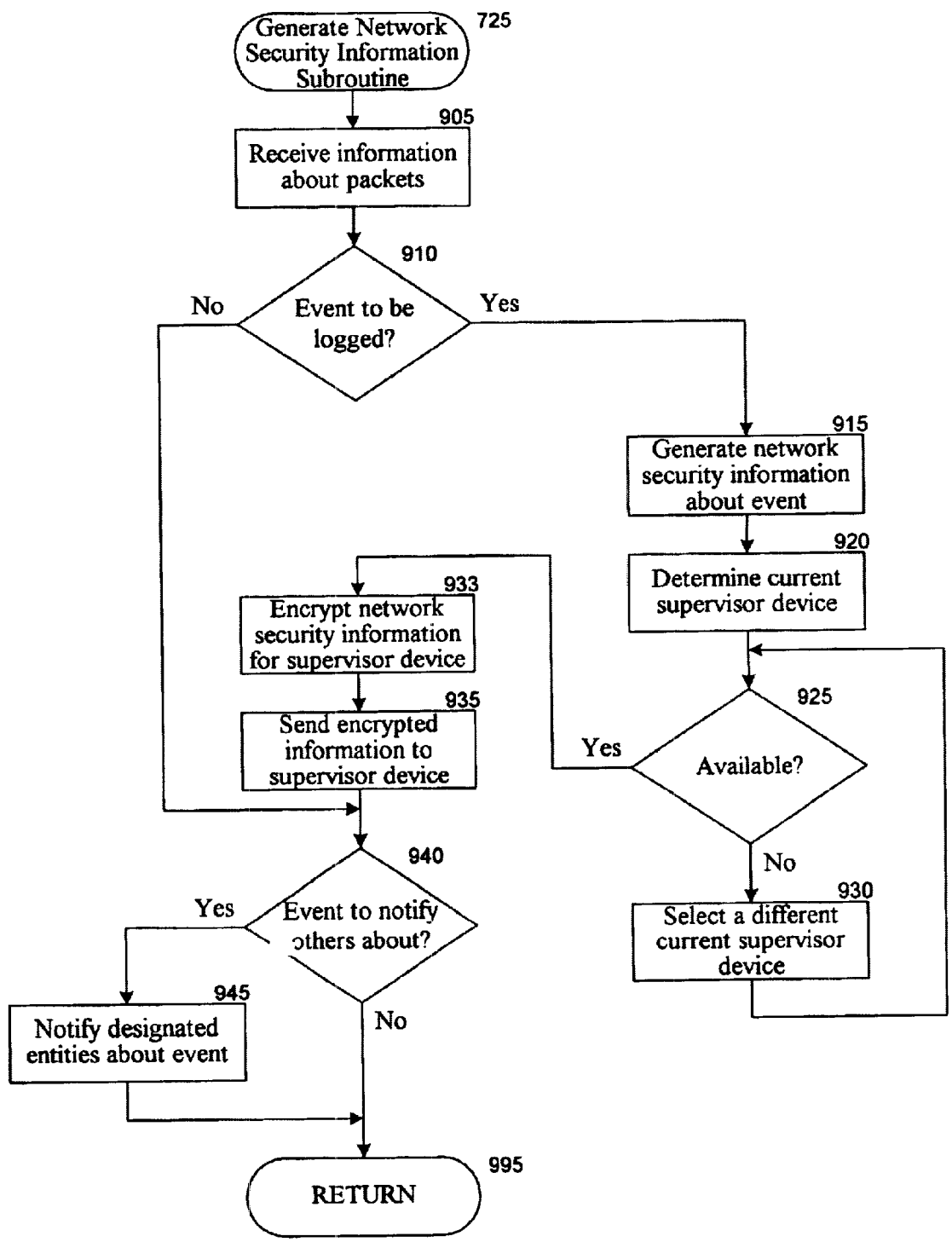
FIG. 9 is an exemplary flow diagram of an embodiment of the Generate Network Security Information subroutine.

FIG. 9 is an exemplary flow diagram of an embodiment of the Generate Network Security Information subroutine 725. The subroutine determines whether an event of interest has occurred (e.g., the application of a filter rule of interest or the detection of a packet matching predefined characteristics of interest such as corresponding to a particular network service), logs network security information about the event if appropriate, and notifies one or more specified entities about the event if appropriate. The subroutine encrypts information before it is transmitted so that it can be transmitted over an external network without fear of the information of interest being intercepted. The subroutine begins at step 905 where information about the network information packets of interest are received. The subroutine continues to step 910 to determine if the packets indicate an event of interest for which network security information is to be logged.

If it is determined in step 910 that the packets indicate an event of interest for which network security information is to be logged, the subroutine continues to step 915 to generate the network security information about the event, such as by extracting information of interest from the packet including the packet sender, intended packet recipient, packet direction, etc. The subroutine then continues to step 920 to determine the supervisor device currently associated with the NSD. The subroutine next determines in step 925 if the current supervisor device is available to receive network security information from the NSD. If not, the subroutine continues to step 930 to determine an alternate supervisor device to be the current supervisor device, and then returns to step 925 to determine if the new supervisor device is available. After a supervisor device is found to be available and designated as the current supervisor device, the subroutine continues to step 933 to encrypt the network security information in a manner accessible by the current supervisor device (e.g., with an asymmetric public key for the supervisor device, or with a symmetric key available to all supervisor devices). The subroutine then continues to step 935 to send the encrypted network security information to the current supervisor device. Any necessary access information (e.g., passwords) can also be included with the sent information.

After step 935, or if it is instead determined in step 910 that the packets do not indicate an event of interest for which network security information is to be logged, the subroutine continues to step 940 to determine if the packets are of a type that require immediate notification of one or more entities (e.g., users, devices, services, etc.). If so, the subroutine continues to step 945 to notify the designated entities in the appropriate manner, such as by using a predefined notification means (e.g., email, a pager, voice mail, a message containing predefined information, etc.). This communication can also be to encrypted as appropriate. After step 945, or if it is instead determined in step 940 that immediate notification of one or more entities is not required, the subroutine continues to step 995 and returns.

Those skilled in the art will appreciate that network security information can be sent to a supervisor device in alternate ways. For example, the NSD could store network security information until a sufficient amount was available before sending it to a supervisor, could send network security information on a periodic basis, could send network security information only when requested by a supervisor device, or could temporarily store network security information while the primary supervisor device or all supervisor devices are unavailable. In addition, network security information can be generated in a variety of ways and can include a variety of information, including sending the entire packets of interest, sending only some information from each packet, or sending only summary reports about multiple packets. In addition, events of interest which trigger the logging of network security information or the notification of some entity can be defined and identified in a variety of ways, such as any packets to or from a particular device or a device in a particular class of devices, any packets for which a specific action are taken (e.g., deny passage), any packets containing contents of interest (e.g., particular words or an attached file of a particular type), any packets corresponding to a particular type of network service (e.g., HTTP requests), etc. Finally, a variety of means for providing security to information being transmitted over a non-secure network can be utilized, including symmetric keys, asymmetric keys, passwords, etc.).

Figure 10:
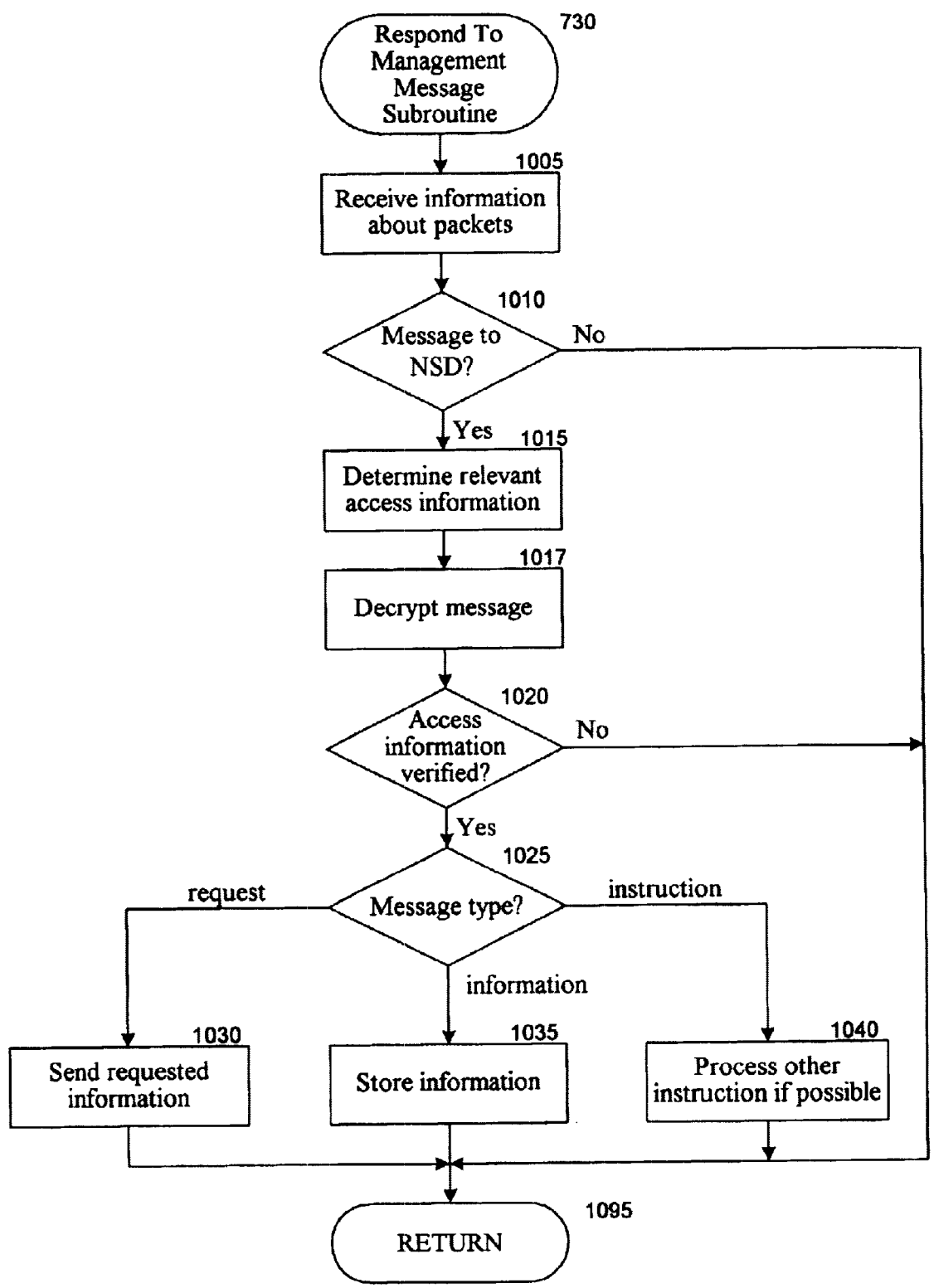
FIG. 10 is an exemplary flow diagram of an embodiment of the Respond To Management Message subroutine.

FIG. 10 is an exemplary flow diagram of an embodiment of the Respond To Management Messages subroutine 730. The subroutine determines whether the NSD has received a management-related message, determines whether the sender of the message is authorized to access management functions of the NSD, decrypts the message if necessary, and responds to the message when appropriate. The subroutine begins at step 1005 where information about the network information packets of interest are received. The subroutine continues to step 1010 to determine whether the packets contain a message that is directed to the NSD. If so, the subroutine continues to step 1015 to determine what access information (e.g., passwords, the sender being on a list of authorized devices, etc.) is required for the message, as well as any information needed to decrypt the message if it is encrypted (e.g., a password, or a public or private key). The subroutine continues to step sz17 to decrypt the message if it is encrypted. The subroutine then continues to step 1020 to verify whether the sender of the message has supplied any necessary access information and otherwise met any other access criteria.

If the necessary access has been verified, the subroutine continues to step 1025 to determine if the message is a request for information (e.g., status of the NSD, NSD configuration information, or network security information), information being supplied (e.g., a security policy template, NSD-specific configuration information, or NSD software), or some other instruction (e.g., reboot the NSD so that new software is used). If it is determined in step 1025 that the message is a request for information, the subroutine continues to step 1030 to supply the requested information if possible, including encrypting the information before sending if appropriate (e.g., if the intended recipient is able to decrypt the information, and the information is sensitive or if all communications are encrypted) and including any necessary access information. If it is determined in step 1025 that the message is information being supplied, the subroutine continues to step 1035 to store the information in the appropriate location. In addition, other actions may be taken automatically if appropriate, such as loading new software immediately if possible. If it is determined in step 1025 that the message is some other instruction, the subroutine continues to step 1040 to process the instruction if possible.

After steps 1030, 1035 or 1040, or if it was determined in step 1010 that the packets do not contain a message directed to the NSD or in step 1020 that the necessary access has not been verified, the subroutine continues to step 1095 and returns. Those skilled in the art will appreciate that a variety of types of messages can be supplied from a supervisor device, directly from a manager device, from another NSD, or from an internal device. In addition, management-related messages can include a variety of types of requests, information, and other instructions.

Figure 11:
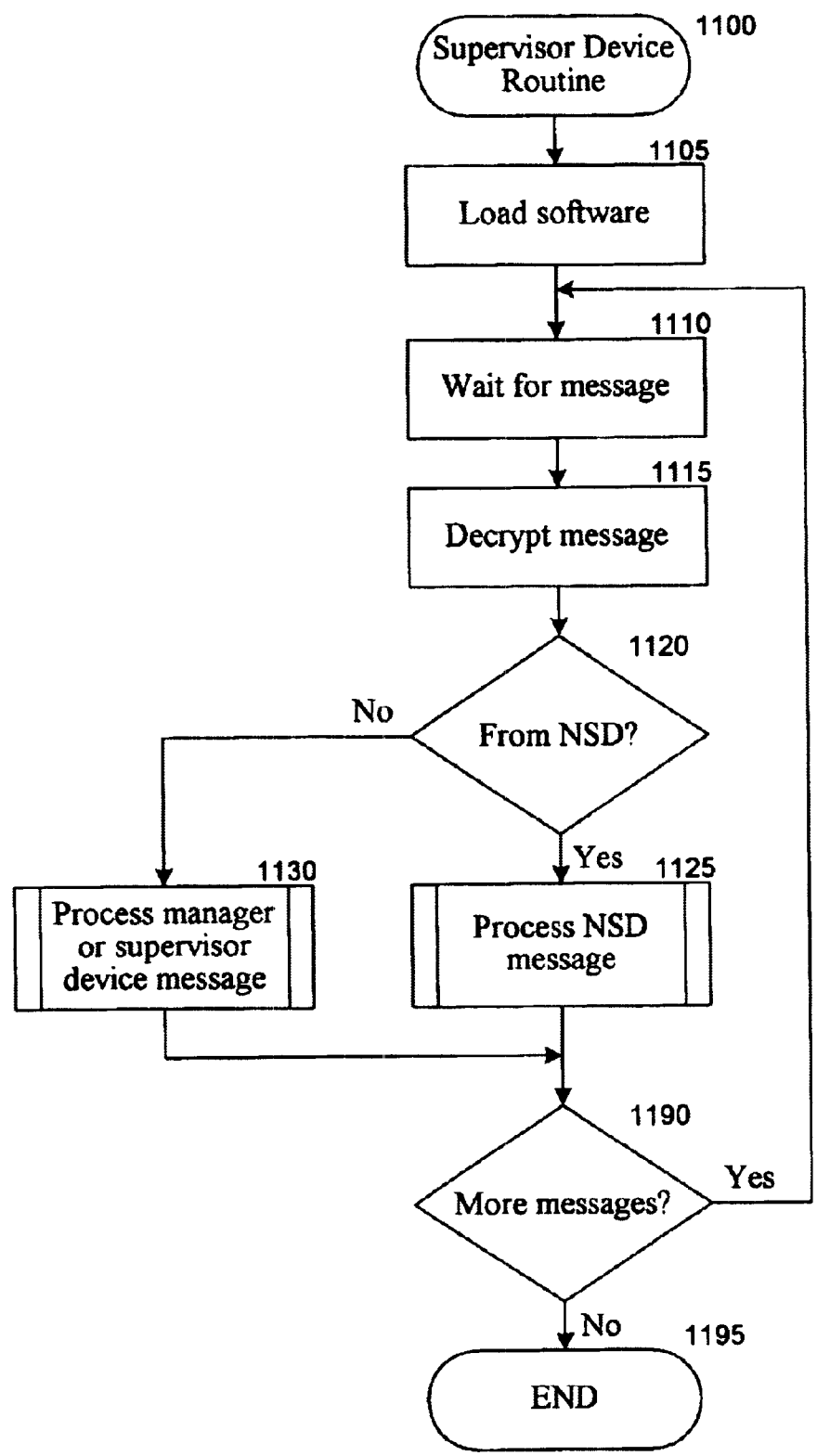
FIG. 11 is an exemplary flow diagram of an embodiment of the Supervisor Device routine.

FIG. 11 is an exemplary flow diagram of an embodiment of the Supervisor Device routine 1100. The routine implements a host device for one or more NSDs by receiving network security information of interest and storing the information until requested by a manager device, as well as assisting the manager device in distributing various information to the NSDs which are currently associated with the supervisor device.

The routine begins at step 1105 where the supervisor device executes an initial boot program that loads the software to be executed by the supervisor device. Those skilled in the art will appreciate that the software can be loaded from local or remote storage. After the software is loaded, the routine continues to step 1110 to wait for a message. After a message is received, the routine continues to step 1115 to decrypt the message if it is encrypted. The decryption can be done in a variety of ways, such as by retrieving decryption information based on the specific sender of the message or based on the type of sender (e.g., NSD or manager device). The routine then continues to step 1120 to determine if the message is from an NSD. If so, the routine processes the message by executing the Process NSD Message subroutine 1125, and if not the routine processes the message by executing the Process Manager Or Supervisor Device Message subroutine 1130. After steps 1125 or 1130, the routine continues to step 1190 to determine whether to continue processing messages. If so, the routine returns to step 1110, and if not the routine ends at step 1195.

Those skilled in the art will appreciate that a supervisor/host device can be implemented in a variety of ways, such as by using a general-purpose computer executing specialized software or by using a special-purpose computer. For example, a general-purpose computer executing an operating system (e.g., SOLARIS™ from Sun Microsystems) and executing software from WatchGuard Technologies, Inc., of Seattle, Wash., such as the WatchGuard Event Processor software, can be used to implement such aspects of a supervisor/host device. In addition, those skilled in the art will appreciate that each supervisor/host device may be able to support a large number (e.g., 500) of NSDs.

Figure 12:
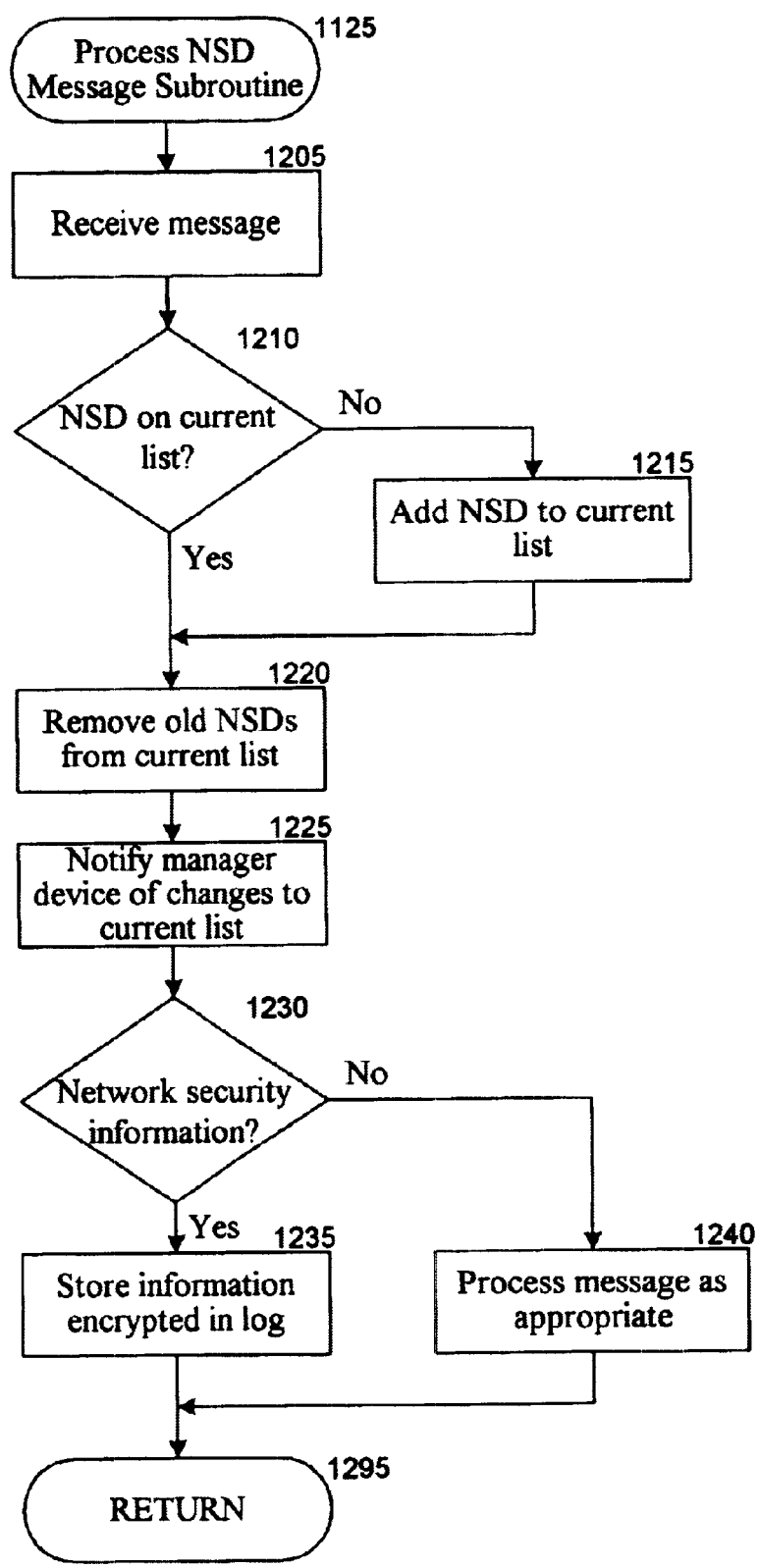
FIG. 12 is an exemplary flow diagram of an embodiment of the Process NSD Message subroutine.

FIG. 12 is an exemplary flow diagram of an embodiment of the Process NSD Message subroutine 1125. The subroutine stores network security information sent by NSDs, notifies the manager device if an NSD not previously associated with the supervisor device begins sending information, and processes other NSD requests as appropriate. The subroutine begins at step 1205 where it receives a decrypted copy of the message sent from the NSD. The subroutine continues to step 1210 to determine if the sending NSD is on the list of NSDs that are currently associated with the supervisor device. If not, the subroutine continues to step 1215 to add the NSD to the current list.

After step 1215, or if it was instead determined that the sending NSD is on the list of NSDs that are currently associated with the supervisor device, the subroutine continues to step 1220 where any NSDs that are shown on the current list but which are not currently associated with the supervisor device are removed from the current list. Whether a listed NSD is still associated with the supervisor device can be determined in a variety of ways, such as by removing NSDs from whom no messages have been received for a certain amount of time or by removing NSDs indicated to be associated with other supervisor devices (e.g., by the NSD, the manager device, or the other supervisor device). The subroutine then continues to step 1225 where, if any NSDs have been added or removed, the manager device is notified of the changes in the current list of NSDs. As with other communications, this communication can be encrypted if appropriate and any necessary access information can be included in the message.

The subroutine then continues to step 1230 to determine if the message from the NSD is composed of network security information. If so, the subroutine continues to step 1235 to store the information in the log maintained by the supervisor device. The information in the log is encrypted before it is stored so that any other device able to access the log cannot obtain access to the contents of the stored network security information. If it is determined in step 1230 that the message from the NSD is not composed of network security information, the subroutine instead continues to step 1240 to process the message from the NSD as appropriate. For example, the NSD may be using the supervisor device as an intermediary when sending a message to another device such as the manager device, another NSD, or another supervisor device. After steps 1235 or 1240, the subroutine continues to step 1295 and returns.

Those skilled in the art will appreciate that NSD messages can be processed in a variety of alternate ways. For example, the list of NSDs may be purged on a periodic basis rather than when each new NSD message is received, and the manager device can be updated as to the changes in the list in a similar manner. In addition, each supervisor device can maintain a single log in which the network security information of multiple NSDs is stored, or can alternately maintain individual logs for each NSD. Similarly, if the supervisor device's log is not accessible to other devices, the information stored in the log file may not be encrypted, with the supervisor device instead encrypting the information before it is sent.

Figure 13:
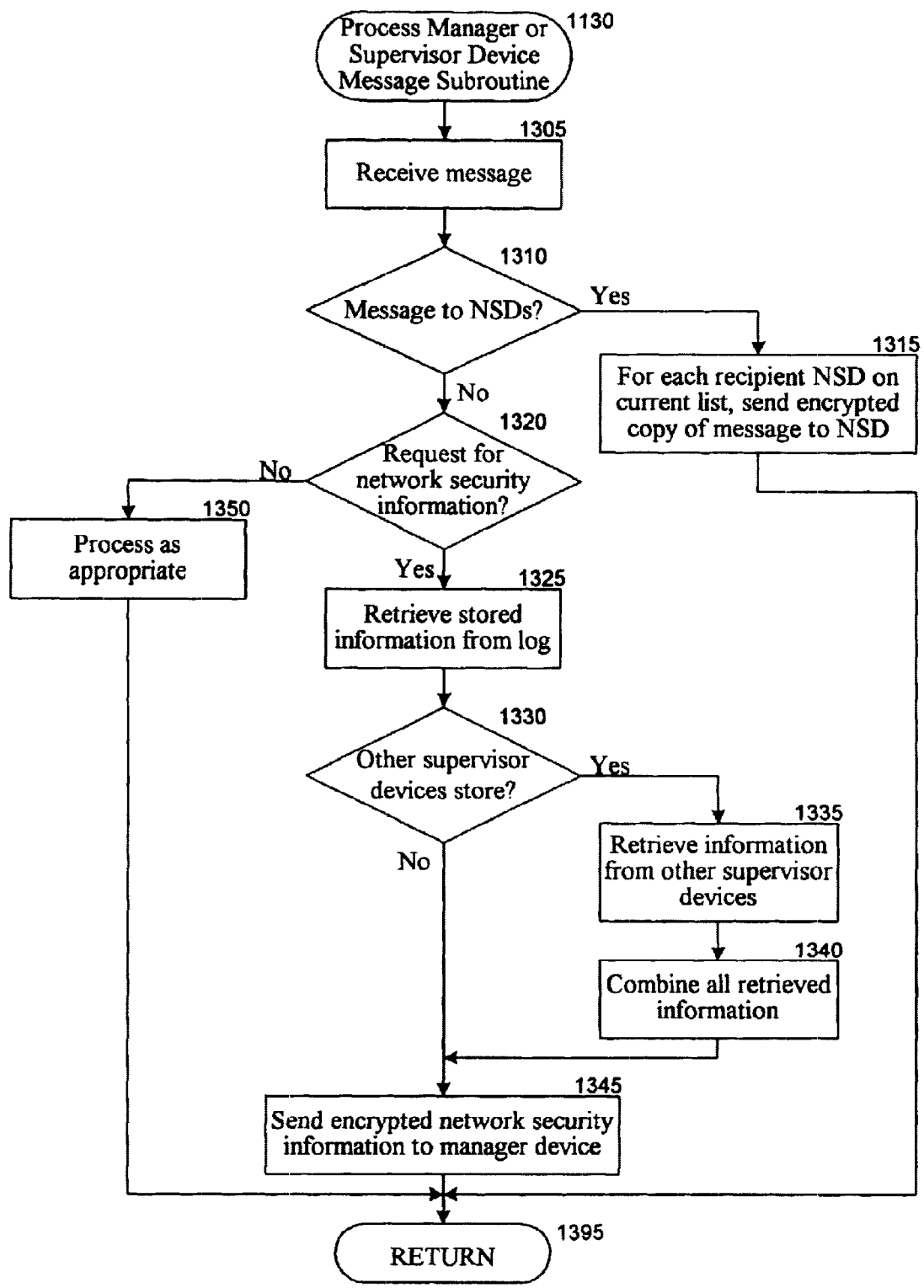
FIG. 13 is an exemplary flow diagram of an embodiment of the Process Manager Or Supervisor Device Message subroutine.

FIG. 13 is an exemplary flow diagram of an embodiment of the Process Manager Or Supervisor Device Message subroutine 1130. The subroutine receives a copy of a message from the manager device that is to be distributed to multiple NSDs, and distributes a copy of the message to each of those NSDs which are currently associated with the supervisor device. The subroutine also receives requests from the manager device or another supervisor device, such as requests from the manager device for the various (potentially distributed) network security information of an NSD, and responds to the request if possible.

The subroutine begins at step 1305 where it receives a decrypted copy of the sent message. The subroutine then continues to step 1310 to determine if the intended recipients of the message include one or more NSDs. If so, the subroutine continues to step 1315 to send a copy of the message to each of the intended recipient NSDs which are on the list of NSDs currently associated with the supervisor device. As with other communications, the messages are sent in an encrypted manner if appropriate and any necessary access information is added to the message.

If it is instead determined in step 1310 that the received message is not intended for NSDs, the subroutine continues to step 1320 to determine if the message is a request from a manager device for the network security information of an NSD. If so, the subroutine continues to step 1325 to retrieve any portions of the requested information which are stored by the supervisor device in the log. The subroutine then continues to step 1330 to determine if any other supervisor devices store at least a portion of the requested information. This can be determined in a variety of ways, such as by receiving a list of all such supervisor devices from the manager device, by querying other supervisor devices if they store any of the requested information (e.g., after analyzing the retrieved information and determining that it is not complete), by querying the NSD to determine to which supervisor devices the NSD has sent network security information, etc.

If it is determined in step 1330 that other supervisor devices store at least a portion of the requested information, the subroutine continues to step 1335 to contact those other supervisor devices and retrieve those portions of the information. The subroutine then continues to step 1340 to combine the various portions of network security information together. After step 1340, or if it was determined in step 1330 that other supervisor devices do not store at least a portion of the requested information, the subroutine sends the retrieved network security information to the requester in step 1345. As with other communications, the network security information is encrypted and the necessary access information is supplied with the information.

The encryption of the network security information to be sent to the manager device can be handled in a variety of ways. If the other supervisor devices from which information is retrieved also encrypt the information stored in their logs, the information can be sent to the requesting supervisor device without decrypting the information. If the manager device is able to decrypt the various portions of the network security information encrypted by different supervisor devices (e.g., if all supervisor devices use the same key for encryption), then the requesting supervisor device can just forward the various encrypted portions of information to the manager device. Alternately, if the requesting supervisor device can decrypt the information from the various other supervisor devices, the requesting supervisor device can combine all of the network security information in a decrypted form and then encrypt the information before sending it to the manager device. Yet another option is for each of the other supervisor devices to encrypt their network security information before sending it to the requesting supervisor device, with the encryption such that the requesting supervisor device can decrypt it (e.g., by using the public key of the requesting supervisor device). Those skilled in the art will appreciate that other methods of sending this information are readily apparent.

If it was instead determined in step 1320 that the message received by the supervisor device is not a request from a manager device for the network security information of an NSD, the subroutine continues to step 1350 to process the message as appropriate. For example, the message may be from another supervisor device that is gathering the network security information of an NSD in preparation for forwarding the information to the manager device. In this situation, the supervisor device forwards the requested network security information to the other supervisor device. After steps 1315, 1345 or 1350, the subroutine continues to step 1395 and returns.

Those skilled in the art will appreciate that requests for network security information may be for amounts of information other than all available information, such as information generated during a specified time period or information of a certain type. In such situations, only the information requested can be returned, or instead all available information can be returned and the requester can extract the desired information. In addition, when sending information to multiple NSDs that are currently associated with multiple supervisor devices, the manager device could send a single message to a single supervisor device (rather than a single message to each of those supervisor devices) and have the single supervisor device distribute the message as necessary to the other supervisor device, or to other NSDs with which the supervisor device is not currently associated.

Figure 14A:
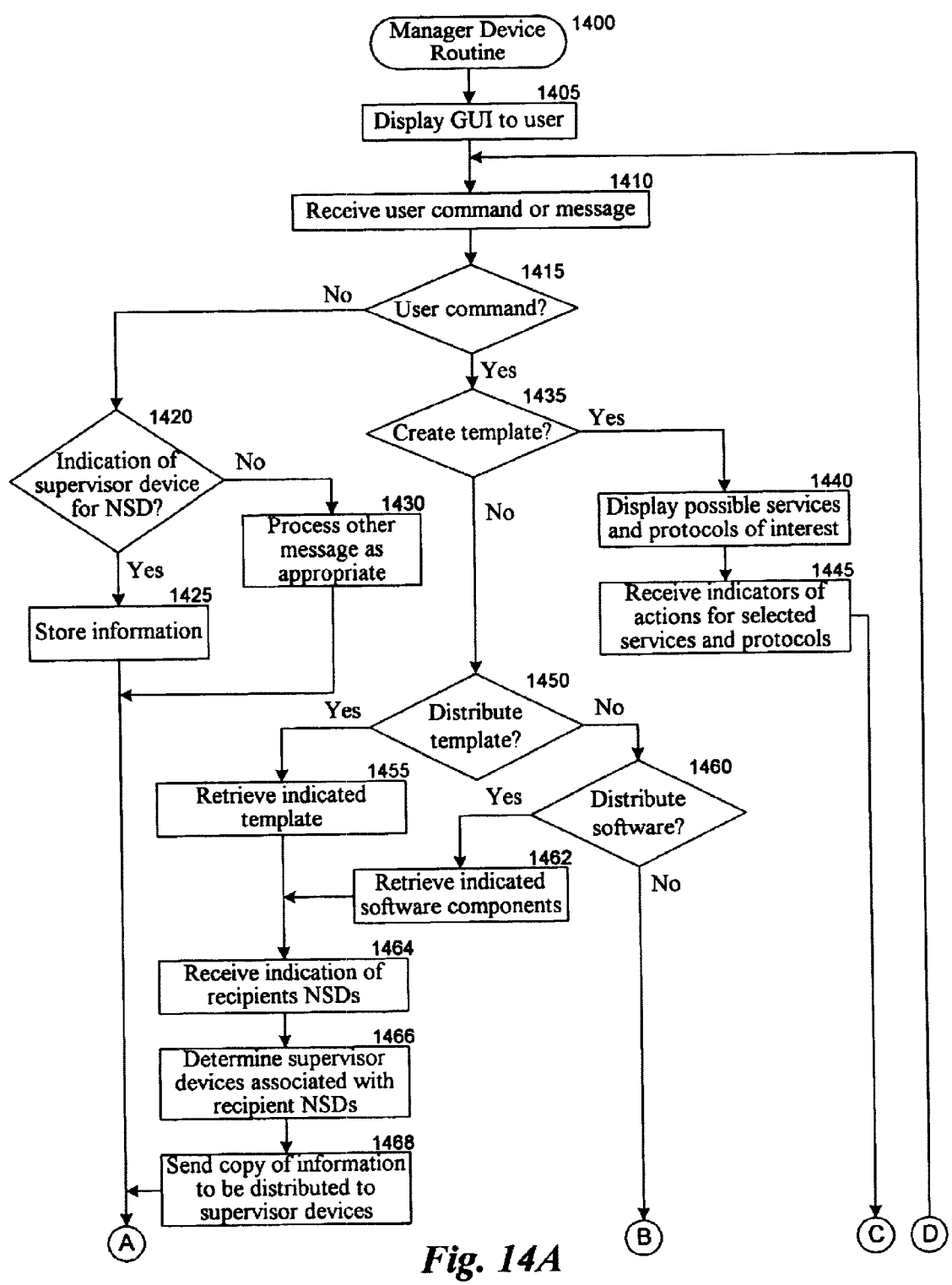
FIGS. 14A and 14B are exemplary flow diagrams of an embodiment of the Manager Device routine.
Figure 14B:
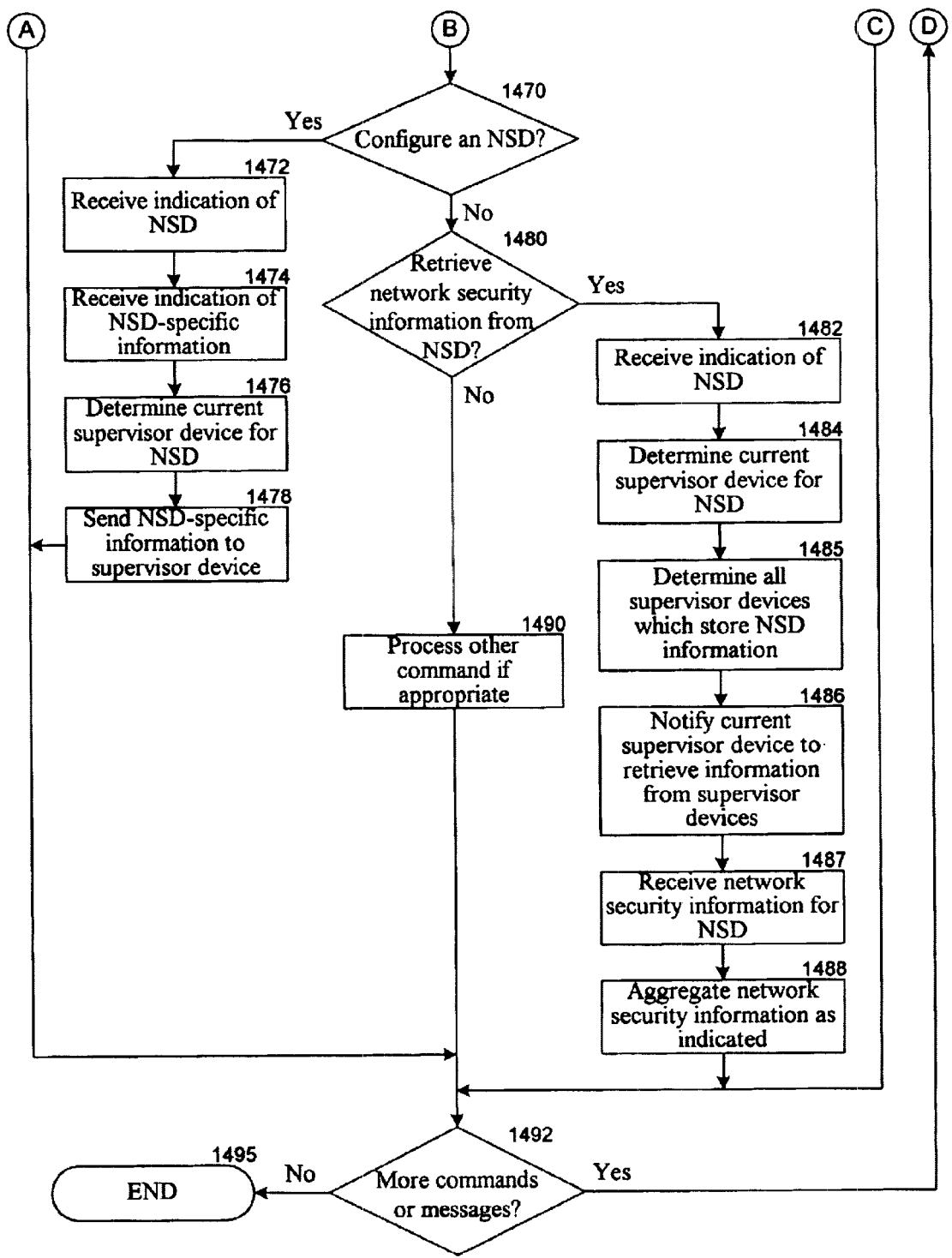

FIGS. 14A and 14B are exemplary flow diagrams of an embodiment of the Manager Device routine. The routine executes on the manager device, and receives messages from supervisor devices such as indications of the supervisor devices currently associated with NSDs that are being managed by the manager device. The manager device also receives a variety of user commands related to managing the NSDs and supervisor devices, and processes the commands as appropriate.

The routine begins at step 1405 where a graphical user interface (GUI) is displayed to the user. This display provides a hierarchical tree view of the various supervisor devices and the NSDs which are associated with each supervisor device. A variety of other types of information can also be conveyed, such as the status of supervisor devices (e.g., available or unavailable), the status of NSDs, the flow of information that is occurring between devices, etc. The GUI also allows the user to easily enter management-related commands, and to display information of interest such as the aggregated network information of one or more NSDs. After step 1405, the routine continues to step 1410 to wait for a user command or for a message.

After receiving a user command or message, the routine continues to step 1415 to determine if a user command was received. If not, the routine continues to step 1420 to determine if the received message is an indication of a current association between an NSD and a supervisor device, such as after a fail-over when the indicated supervisor device became the current supervisor device for an NSD after the primary supervisor device for the NSD was unavailable. If it is determined in step 1420 that the received message is an indication of a current association between an NSD and a supervisor device, the routine continues to step 1425 to store the association information. If it is determined in step 1420 that the received message is not an indication of a current association between an NSD and a supervisor device, the routine continues to step 1430 to process the message as appropriate.

If it was instead determined in step 1415 that a user command was received, the routine continues to step 1435 to determine if the command is to create or modify a security policy template. If so, the routine continues to step 1440 to display a list of possible network services and protocols that may be of interest. The routine then continues to step 1445 where the user can indicate one or more services or protocols for which filter rules are to be created. For each service or protocol, the user specifies the specific characteristics which network information packets must have to match the rule (e.g., from a specific sender to any recipient, or incoming messages from any device of a specified type or class). The user also specifies the appropriate action to be taken with network information packets that satisfy the rule. The user can also specify aliases which are to be customized with NSD-specific configuration information when the template is loaded on a particular NSD. For example, if the user defines one or more filter rules related to an internal HTTP server, an alias can be created that will eventually hold the NSD-specific information about the particular HTTP server. After the filter rules and other information of the security policy template are defined or modified, the security policy template is stored.

If it was instead determined in step 1435 that the command is not to create or modify a security policy template, the routine continues to step 1450 to determine if the command is to distribute a security policy template to one or more NSDs. If so, the routine continues to step 1455 to receive an indication from the user of the template to be distributed, and to then retrieve a copy of the indicated template. If it was instead determined in step 1450 that the command is not to distribute a security policy template to one or more NSDs, the routine continues to step 1460 to determine if the command is to distribute one or more software components to one or more NSDs. If so, the routine continues to step 1462 to receive an indication from the user of the software components to be distributed, and to then retrieve copies of the indicated software components. After steps 1455 or 1462, the routine continues to step 1464 to receive from the user an indication of the NSDs to receive either the template or the software components. The routine continues to step 1466 to determine the one or more supervisor devices currently associated with the indicated NSDs, and then continues to step 1468 to send a single copy of the information to be distributed to each of the determined supervisor devices. The copy of the information sent to the supervisor devices includes an indication of the NSDs that are to receive the information being distributed.

If it was instead determined in step 1460 that the command is not to distribute one or more software components, the routine continues to step 1470 to determine if the command is to configure an NSD by supplying NSD-specific information to customize a security policy template. If so, the routine continues to step 1472 to receive an indication of the NSD to be configured. The routine then continues to step 1474 to receive an indication from the user of the NSD-specific information which is to be used to configure the NSD. The routine then determines in step 1476 the supervisor device that is currently associated with the NSD, and in step 1478 sends the NSD-specific information to the supervisor device for forwarding to the NSD. Those skilled in the art will appreciate that rather than merely sending the information to the NSD, the supervisor device could send instructions to the NSD to load or modify the configuration of the NSD in an appropriate manner.

If it was instead determined in step 1470 that the command is not to configure an NSD, the routine continues to step 1480 to determine if the command is to retrieve aggregated network security information from an NSD. If so, the routine continues to step 1482 to receive an indication of the NSD. The routine then continues to step 1484 to determine the supervisor device that is currently associated with the NSD, and in step 1485 determines all supervisor devices which store network security information for the NSD. The routine then continues to step 1486 to notify the current supervisor device to retrieve the network security information of interest for the NSD, including indicating to the current supervisor device the other supervisor devices which may store portions of the network security information. The routine then continues to step 1487 to wait for the network security information. After receiving the network security information, the routine in step 1488 aggregates the network security information as appropriate. Those skilled in the art will appreciate that the network security information can be aggregated in a variety of ways, either automatically or in response to user indications.

If it was instead determined in step 1480 that the command is not to retrieve aggregated network security information, the routine continues to step 1490 to process the command if appropriate. After steps 1425, 1430, 1445, 1468, 1478, 1488, or 1490, the routine then continues to step 1492 to determine whether to continue processing messages and commands. If so, the routine returns to step 1410, and if not the routine ends at step 1495.

Those skilled in the art will appreciate that a manager device can be implemented in a variety of ways, such as by using a general-purpose computer executing specialized software or by using a special-purpose computer. For example, a general-purpose computer executing an operating system (e.g., WINDOWS 95™ or WINDOWS NT™ from Microsoft Corp.) and executing software from Watch-Guard Technologies, Inc., of Seattle, Wash., such as the Global Policy Manager, Graphical Monitor, Historical Reporting Module, Global Console, WebBlocker, Branch Office VPN, Network Configuration Wizard and Security Management System (SMS) Control Center software components, can be used to implement some aspects of a manager device.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A computer-implemented method for a manager device to distribute security policy implementation information to multiple security devices for use in implementing a security policy, the distributing via multiple intermediate supervisor devices that are associated with the multiple security devices in such a manner that each security device has a current associated supervisor device, the method comprising, under control of the manager device and without manual intervention:

for each of the security devices, determining the currently associated supervisor device for that security device;

distributing a single copy of the security policy implementation information to each of the determined supervisor devices; and indicating to each of the determined supervisor devices to distribute a copy of the security policy implementation information to the security devices with which the supervisor device is associated.

2. The method of claim 1 wherein the security policy implementation information is software to be executed by the security devices to control the implementing of the security policy.

3. The method of claim 1 wherein the security policy implementation information is a security policy template that indicates the security information to be generated.

4. The method of claim 3 including:

after the security policy implementation information has been distributed to each of the security devices, configuring the security policy implementation information distinctly on each security device.

5. The method of claim 1 wherein the security policy implementation information is an instruction to be executed by the multiple security devices related to the implementing of the security policy.

6. The method of claim 1 wherein the security policy implementation information is information common to the multiple security devices, and wherein for each of the multiple security devices the common information is for configuring a security policy template for the security device with information specific to the security device.

7. The method of claim 1 wherein before the security policy implementation information is distributed to each of the multiple security devices, at least some of the multiple security devices have existing security policy implementation information of a similar type, and wherein for those security devices the security policy implementation information to be distributed will replace the existing security policy implementation information.

8. The method of claim 1 wherein before the security policy implementation information is distributed to each of the multiple security devices, at least some of the multiple security devices have existing security policy implementation information of a similar type, and wherein for those security devices the security policy implementation information to be distributed will supplement the existing security policy implementation information.

9. The method of claim 1 wherein the distributing of the security policy implementation information to each of the determined supervisor devices is performed in a manner such that the security policy implementation information is not accessible to other devices.

10. The method of claim 1 including displaying to a user a view of the multiple security devices and the supervisor devices currently associated with the security devices, and wherein the distributing of the security policy implementation information is in response to a visual selection by the user.

11. A method for a supervisor device to distribute security policy implementation information to multiple security devices for use in implementing a security policy, the method comprising:

receiving from a manager device a single copy of security policy implementation information to be distributed to multiple security devices; and for each of the multiple security devices, if the supervisor device is associated with the security device, automatically distributing the security policy implementation information to the security device.

12. The method of claim 11 wherein the security policy implementation information is software to be executed by the security devices to control the implementing of the security policy.

13. The method of claim 11 wherein the security policy implementation information is a security policy template that indicates the security information to be generated.

14. The method of claim 13 including:

after the security policy implementation information has been distributed to each of the security devices, configuring the security policy implementation information distinctly on each security device.

15. The method of claim 13 including:

before the security policy implementation information has been distributed to each of the security devices, for each security device configuring distinctly for that device a copy of the security policy implementation information that is to be distributed to that device.

16. The method of claim 13 including:

for each of the security devices, sending to the security device a control instruction indicating an action to be taken with the security policy implementation information by the security device.

17. The method of claim 11 wherein the security policy implementation information is an instruction to be performed by the security devices related to the implementing of the security policy.

18. The method of claim 11 wherein the supervisor device distributes the security policy implementation information to a security device only when the supervisor device is associated with the security device as a primary supervisor device for the security device.

19. The method of claim 11 including when the supervisor device is not associated with one of the multiple security devices, distributing the security policy implementation information to another supervisor device to be distributed to the one security device.

20. A computer-implemented method for distributing control information to multiple security devices for use in controlling the operation of the multiple security devices, the method comprising:
   for each of the security devices, determining a supervisor device for the security device based at least in part on the determined supervisor device being currently associated with the security device;
   distributing the control information to each of the determined supervisor devices; and
   indicating to each of the determined supervisor devices to distribute the control information to the security devices with which the supervisor device is associated.

21. The method of claim 20 wherein after the control information is distributed to the security devices, the security devices operate in accordance with the control information.

22. A computer-implemented method for distributing security policy implementation information to multiple security devices for use in implementing a security policy, the method comprising:
   displaying to a user a view of the multiple security devices and of multiple supervisor devices;
   receiving from the user visual indications of multiple security devices to which the security policy implementation information is to be distributed;
   distributing the security policy implementation information to a supervisor device associated with each of the security devices; and
   indicating to the associated supervisor device to distribute the security policy implementation information to each of the security devices.

23. The method of claim 22 including:
   displaying to the user multiple pieces of security policy implementation information; and
   determining the security policy implementation information to be distributed based on a visual indication by the user.

24. The method of claim 22 wherein the view of the security devices and of the supervisor devices includes a visual indication of a supervisor device that is a primary host device for the security device.

25. The method of claim 22 wherein a visual indication for each of the multiple security devices is modified to indicate receipt by the security device of the security policy implementation information.

26. A computer-implemented method for distributing security policy implementation information to multiple security devices for use in implementing a security policy, the method comprising:
   displaying to a user a view of a manager device, the multiple security devices and of multiple supervisor devices;
   receiving from the user indications of multiple security devices to which the security policy implementation information is to be distributed; and
   displaying to the user an indication that the security policy implementation information is distributed to the multiple security devices, the distribution accomplished by the manager device sending the security policy implementation information to a supervisor device associated with each of the security devices and indicating to the associated supervisor device to distribute the security policy implementation information to each of the security devices.

27. The method of claim 26 including:
   displaying to the user multiple pieces of security policy implementation information; and
   determining the security policy implementation information to be distributed based on a visual indication by the user.

28. The method of claim 26 wherein the view of the security devices and of the supervisor devices includes a visual indication that the associated supervisor device distributes the security policy implementation information to each of the security devices.

29. The method of claim 26 wherein a visual indication for each of the multiple security devices is modified to indicate receipt by the security device of the security policy implementation information.

30. The method of claim 26 wherein the multiple security devices to which the security policy implementation information is to be distributed are indicated from a selection by the user of the associated supervisor device.

31. A computer-readable medium whose contents cause a manager device to distribute security policy implementation information to multiple security devices for use in implementing a security policy, by automatically performing a method comprising:
   for each of the security devices, determining a supervisor device based at least in part on that supervisor device being currently associated with the security device;
   distributing the security policy implementation information to each of the determined supervisor devices; and
   indicating to each of the determined supervisor devices to distribute the security policy implementation information to the security devices with which the supervisor device is associated.

32. The computer-readable medium of claim 31 wherein the security policy implementation information is software to be executed by the security devices to control the implementing of the security policy.

33. The computer-readable medium of claim 31 wherein the security policy implementation information is a security policy template that indicates the security information to be generated.

34. The computer-readable medium of claim 33 wherein the contents further cause the manager device to, after the security policy implementation information has been distributed to each of the security devices, configure the security policy implementation information distinctly on each security device.

35. The computer-readable medium of claim 31 wherein the security policy implementation information is an instruction to be executed by the multiple security devices related to the implementing of the security policy.

36. The computer-readable medium of claim 31 wherein the contents further cause the manager device to display to a user a view of the multiple security devices and the supervisor devices currently associated with the security devices, and wherein the distributing of the security policy implementation information is in response to a visual selection by the user.

37. A computer system for distributing security policy implementation information to multiple security devices for use in implementing a security policy, comprising:

a security device associator for determining for each of the security devices a supervisor device currently associated with the security device; and an information distributor for distributing the security policy implementation information to each of the determined supervisor devices, and for indicating to each of the determined supervisor devices to distribute the security policy implementation information to the security devices with which the supervisor device is associated.

38. The computer system of claim 37 wherein the security policy implementation information is software to be executed by the security devices to control the implementing of the security policy.

39. The computer system of claim 37 wherein the security policy implementation information is a security policy template that indicates the security information to be generated.

40. The computer system of claim 37 including a user interface component for displaying to a user a view of the multiple security devices and the supervisor devices currently associated with the security devices, and for receiving a visual selection by the user that controls the distributing of the security policy implementation information.

41. A generated data signal transmitted via a data transmission medium from a manager device to a supervisor device, the data signal including a single copy of security policy implementation information to be distributed by the supervisor device to multiple security devices, the security policy implementation information for use by the supervisor devices in implementing a security policy, so that the manager device can efficiently distribute information to multiple security devices via a supervisor device.

42. The data signal of claim 41 wherein the security policy implementation information is software to be executed by the security devices to control the implementing of the security policy.

43. The data signal of claim 41 wherein the security policy implementation information is a security policy template that indicates the security information to be generated.

44. The data signal of claim 41 including configuration information to be distributed by the supervisor device to at least one security device, the configuration information specific to the at least one security device, the configuration information for configuring distinctly for the at least one security device a copy of the security policy implementation information that is to be distributed to that device.

45. A computer-implemented method for automatically distributing security policy implementation information to multiple security devices for use in implementing a security policy, the method comprising, under control of a manager device:

automatically distributing a security policy template to the multiple security devices, by
identifying multiple supervisor devices based on a current association of each of the identified supervisor devices with at least one of the multiple security devices, at least one of the identified supervisor devices currently associated with multiple of the multiple security devices;
distributing a single copy of the security policy template to each of the identified supervisor devices; and
indicating to each of the identified supervisor devices to distribute a copy of the security policy template to the security devices with which the supervisor device is associated; and for each of at least some of multiple security devices, automatically configuring the security policy template on that security device in such a manner that the configured security policy template is distinct from configured security policy templates on other of the multiple security devices.

46. The method of claim 45 wherein each of the multiple security devices has at least one currently associated identified supervisor device.

47. The method of claim 45 wherein at least some of the multiple security devices each have a currently associated primary supervisor device and or more other currently associated supervisor devices.

* * * * *

UNITED STATES PATENT AND TRADEMARK OFFICE
CERTIFICATE OF CORRECTION

PATENT NO.   : 6,678,827 B1
DATED        : January 13, 2004
INVENTOR(S)  : Peter M. Rothermel et al.

It is certified that error appears in the above-identified patent and that said Letters Patent is hereby corrected as shown below:

Column 9,
Line 6, delete space between "Tho" and "se";

Column 10,
Line 52, "in the security to policy 315" should be -- in the security policy 315 --;

Column 16,
Line 59, "can also be to encrypted" should be -- can also be encrypted --;

Signed and Sealed this

Twenty-second Day of June, 2004

JON W. DUDAS
*Acting Director of the United States Patent and Trademark Office*